United States Patent
Tola, Jr.

(10) Patent No.: US 9,992,180 B2
(45) Date of Patent: *Jun. 5, 2018

(54) SYSTEMS AND METHODS FOR PROTECTING COMMUNICATIONS BETWEEN NODES

(71) Applicant: SMART SECURITY SYSTEMS LLC, Boulder, CO (US)

(72) Inventor: Kenneth C. Tola, Jr., Boulder, CO (US)

(73) Assignee: SMART SECURITY SYSTEMS LLC, Boulder, CO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/136,641

(22) Filed: Apr. 22, 2016

(65) Prior Publication Data
US 2016/0241526 A1    Aug. 18, 2016

Related U.S. Application Data

(63) Continuation of application No. 13/480,057, filed on May 24, 2012, now Pat. No. 9,325,676.

(51) Int. Cl.
*H04L 29/06*        (2006.01)
*H04L 29/08*        (2006.01)
*H04L 12/26*        (2006.01)

(52) U.S. Cl.
CPC .......... *H04L 63/0478* (2013.01); *H04L 43/08* (2013.01); *H04L 63/0421* (2013.01); *H04L 63/0823* (2013.01); *H04L 63/166* (2013.01); *H04L 67/1095* (2013.01);

(Continued)

(58) Field of Classification Search
CPC ... G06F 9/5061; G06F 21/00; H04L 2209/16; H04L 63/166; H04L 63/0478; H04L 63/0832; H04L 63/2833; H04L 69/323; H04L 43/08; H04L 63/0421; H04L 67/1095
See application file for complete search history.

(56) References Cited

U.S. PATENT DOCUMENTS

| 6,131,163 A | 10/2000 | Wiegel |
| 6,212,574 B1 | 4/2001 | O'Rourke et al. |
| 6,408,061 B1 | 6/2002 | Donak et al. |

(Continued)

FOREIGN PATENT DOCUMENTS

JP    2009-284448    12/2009

OTHER PUBLICATIONS

Varma et al. "Node Categorization Scheme (NCS) for Throughput Efficiency in Multi-rate Mobile Ad hoc Networks," International Journal of Computer Applications (0975-8887), Feb. 2010, vol. 1, No. 1, pp. 34-37.

(Continued)

*Primary Examiner* — Don G Zhao
(74) *Attorney, Agent, or Firm* — Lewis Brisbois Bisgaard & Smith LLP

(57) ABSTRACT

Systems and methods for protecting communications between at least two nodes protect the identity of a node requesting information, provide content of communications being sent and/or obscuring a type of communications being sent. Varying degrees of protection options including encryption, intermediate node termination and direct node communications are provided.

18 Claims, 12 Drawing Sheets

(52) U.S. Cl.
CPC ........ *H04L 67/2833* (2013.01); *H04L 69/323*
(2013.01); *H04L 2209/16* (2013.01)

(56) References Cited

U.S. PATENT DOCUMENTS

| | | | |
|---|---|---|---|
| H002065 H | 5/2003 | Hong et al. | |
| 6,690,678 B1 | 2/2004 | Basso | |
| 6,850,986 B1 | 2/2005 | Peacock | |
| 7,293,095 B2 | 11/2007 | Gbadegesin | |
| RE41,168 E | 3/2010 | Shannon | |
| 7,777,651 B2 | 8/2010 | Fallon et al. | |
| RE41,811 E | 10/2010 | Gutman et al. | |
| RE42,212 E | 3/2011 | Hoffman | |
| 8,019,884 B2 | 9/2011 | Manning et al. | |
| 8,020,201 B2 | 9/2011 | Adusumilli et al. | |
| 8,683,572 B1 | 3/2014 | Mahalingaiah | |
| 9,348,927 B2 | 5/2016 | Tola | |
| 2002/0024931 A1 | 2/2002 | Chikazawa | |
| 2003/0101253 A1 | 5/2003 | Saito | |
| 2003/0204717 A1 | 10/2003 | Kuehnel | |
| 2004/0103205 A1* | 5/2004 | Larson .................. | H04L 63/10 709/229 |
| 2006/0029062 A1 | 2/2006 | Rao et al. | |
| 2006/0037072 A1 | 2/2006 | Rao et al. | |
| 2006/0093135 A1 | 5/2006 | Fiatal et al. | |
| 2006/0123226 A1 | 6/2006 | Kumar et al. | |
| 2006/0200660 A1* | 9/2006 | Woods ................ | H04L 63/0442 713/155 |
| 2007/0011146 A1 | 1/2007 | Holbrook | |
| 2007/0011272 A1* | 1/2007 | Bakke .................. | G06F 9/5027 709/217 |
| 2007/0091927 A1* | 4/2007 | Apostolopoulos | H04L 29/06027 370/473 |
| 2007/0150075 A1 | 6/2007 | Dumas | |
| 2007/0300290 A1 | 12/2007 | Shay | |
| 2008/0034416 A1* | 2/2008 | Kumar ................ | H04L 63/0272 726/15 |
| 2008/0270417 A1* | 10/2008 | Roker .................. | G06Q 30/02 |
| 2008/0279198 A1 | 11/2008 | Gruber | |
| 2008/0281900 A1 | 11/2008 | Boulia | |
| 2008/0304518 A1* | 12/2008 | Cheng ................... | H04L 67/20 370/474 |
| 2008/0306815 A1* | 12/2008 | Dykes .................. | G06Q 30/02 705/14.73 |
| 2009/0006612 A1 | 1/2009 | Asai | |
| 2009/0119752 A1 | 5/2009 | Chandrashekhar et al. | |
| 2009/0157883 A1 | 6/2009 | Maffeis | |
| 2009/0172802 A1 | 7/2009 | Mosek et al. | |
| 2009/0177761 A1 | 7/2009 | Meyer et al. | |
| 2009/0182803 A1 | 7/2009 | Barton et al. | |
| 2009/0249467 A1 | 10/2009 | Webb-Johnson | |
| 2009/0296685 A1* | 12/2009 | O'Shea .................. | H04L 69/32 370/351 |
| 2009/0313290 A1 | 12/2009 | Narayanan et al. | |
| 2009/0319661 A1 | 12/2009 | Shiozawa | |
| 2010/0005194 A1* | 1/2010 | Perkins .............. | H04B 7/18506 709/246 |
| 2010/0031019 A1 | 2/2010 | Manning et al. | |
| 2010/0064234 A1 | 3/2010 | Schreiber et al. | |
| 2010/0064340 A1 | 3/2010 | McCorkendale et al. | |
| 2010/0103837 A1* | 4/2010 | Jungck .............. | H04L 29/12066 370/252 |
| 2010/0142560 A1* | 6/2010 | Sharivker ......... | H04L 29/12839 370/475 |
| 2010/0153568 A1 | 6/2010 | Uola et al. | |
| 2010/0162235 A1 | 6/2010 | Ginzton et al. | |
| 2010/0174817 A1 | 7/2010 | Chetuparambil et al. | |
| 2010/0175122 A1 | 7/2010 | Ballard | |
| 2010/0192197 A1 | 7/2010 | Nadalin et al. | |
| 2010/0205215 A1 | 8/2010 | Cook et al. | |
| 2010/0226256 A1 | 9/2010 | Kato et al. | |
| 2010/0268782 A1 | 10/2010 | Zombek et al. | |
| 2011/0016197 A1 | 1/2011 | Shiimori et al. | |
| 2011/0075845 A1 | 3/2011 | Calcev et al. | |
| 2011/0106518 A1 | 5/2011 | Shin | |
| 2011/0119376 A1 | 5/2011 | Bardsley et al. | |
| 2011/0138069 A1 | 6/2011 | Momchilov et al. | |
| 2011/0154026 A1* | 6/2011 | Edstrom ............. | H04L 63/0823 713/158 |
| 2011/0209199 A1 | 8/2011 | Fenton et al. | |
| 2011/0214131 A1 | 9/2011 | Luna | |
| 2011/0216680 A1 | 9/2011 | Vogt et al. | |
| 2011/0219057 A1 | 9/2011 | Scoda | |
| 2011/0225646 A1 | 9/2011 | Crawford | |
| 2011/0231479 A1 | 9/2011 | Boydstun et al. | |
| 2011/0231555 A1 | 9/2011 | Ebrahimi et al. | |
| 2011/0231652 A1 | 9/2011 | Bollay et al. | |
| 2011/0231923 A1 | 9/2011 | Bollay et al. | |
| 2011/0282997 A1 | 11/2011 | Prince et al. | |
| 2011/0296196 A1 | 12/2011 | Konetski et al. | |
| 2012/0011098 A1 | 1/2012 | Yamada | |
| 2012/0047180 A1 | 2/2012 | Kirshenbaum | |
| 2012/0084487 A1* | 4/2012 | Barde .................. | G06F 9/45541 711/6 |
| 2012/0124641 A1 | 5/2012 | Hegge et al. | |
| 2012/0246126 A1 | 9/2012 | Rodriguez | |
| 2012/0284712 A1 | 11/2012 | Nimmagadda et al. | |
| 2013/0227165 A1* | 8/2013 | Liu ...................... | H04L 67/1027 709/238 |
| 2013/0297703 A1 | 11/2013 | Van Ackere | |
| 2013/0298235 A1* | 11/2013 | Smith .................. | H04L 63/0414 726/23 |
| 2013/0298236 A1* | 11/2013 | Smith .................. | H04L 63/1491 726/23 |
| 2014/0003434 A1 | 1/2014 | Assarpour et al. | |
| 2016/0269248 A1 | 9/2016 | Tola | |
| 2016/0337484 A1 | 11/2016 | Tola | |

OTHER PUBLICATIONS

International Search Report and Written Opinion for International (PCT) Patent Application No. PCT/US2013/039805, dated Sep. 17, 2013 9 pages.

International Preliminary Reoport on Patentability for International (PCT) Patent Application No. PCT/US2013/039805, dated Nov. 11, 2014 7 pages.

Extended European Search Report dated Dec. 8, 2015, for European application No. 13788414.4.

Official Action for European Patent Application No. 13788414.4, dated Sep. 8, 2016 4 pages.

International Search Report and Written Opinion for International (PCT) Patent Application No. PCT/US2015/013433, dated Jun. 4, 2015 11 pages.

International Preliminary Report on Patentability for International (PCT) Patent Application No. PCT/US2015/013433, dated Aug. 2, 2016 8 pages.

Official Action for U.S. Appl. No. 13/465,799, dated Feb. 13, 2013 7 pages Restriction Requirement.

Official Action for U.S. Appl. No. 13/465,799, dated May 15, 2013 18 pages.

Official Action for U.S. Appl. No. 13/465,799, dated Jan. 16, 2014 22 pages.

Official Action for U.S. Appl. No. 13/465,799, dated Jun. 20, 2014 24 pages.

Official Action for U.S. Appl. No. 13/465,799, dated Feb. 11, 2015 25 pages.

Official Action for U.S. Appl. No. 13/465,799, dated Jul. 17, 2015 25 pages.

Notice of Allowance for U.S. Appl. No. 13/465,799, dated Feb. 3, 2016 20 pages.

Official Action for U.S. Appl. No. 13/480,057, dated Oct. 24, 2013 24 pages.

Official Action for U.S. Appl. No. 13/480,057, dated May 19, 2014 34 pages.

Official Action for U.S. Appl. No. 13/480,057, dated Dec. 5, 2014 34 pages.

Official Action for U.S. Appl. No. 13/480,057, dated Jun. 22, 2015 41 pages.

(56) References Cited

OTHER PUBLICATIONS

Notice of Allowance for U.S. Appl. No. 13/480,057, dated Dec. 18, 2015 9 pages.

* cited by examiner

SYSTEMS AND METHODS FOR PROTECTING COMMUNICATIONS BETWEEN NODES

CROSS-REFERENCE TO RELATED APPLICATIONS

This application is a continuation of U.S. application Ser. No. 13/480,057 filed May 24, 2012, entitled "Systems and Methods for Protecting Communications Between Nodes" which is incorporated herein by reference in its entirety for all purposes.

BACKGROUND

Field of the Disclosure

Example embodiments of the present disclosure relate to the use of various techniques to protect communications between nodes.

Description of Related Art

Conventional web tracking solutions are typically separated into solutions loaded in a customer's server, for example, packet "sniffing" and Internet Information Services (IIS) log file analysis software, and solutions that attempt to track page level activity and which take the form of code inserted in a web page, third party Web "cookies" or software applications.

Various countries, corporations and Internet Service Providers block, censor or filter communications transmitted between two or more nodes. These communications can occur via the Internet, an Extranet, an Intranet or any other communication path that allows two nodes to communicate with one another. The mode of communication between the nodes is independent of the communication path and includes, for example, client/server, peer-to-peer and mainframe communication architectures. All types of communications, including, for example, wireless, cellular, wired, optical and satellite communications may be subject to censorship. Moreover, each of the various modes of communication including, for example, client-server, mainframe, distributed and peer-to-peer, are subject to censorship.

For example, a user may subscribe to an Internet sports package to watch sporting events over a network. The user can request and watch so-called out of market games, but the games are often censored (referred to as "blacked out") when a team is playing locally and the televised version of the game is available on local free or pay television channels. The distributor of the content identifies the source of the content request and denies the request if the source is within the blackout areas.

FIG. 1 is a schematic diagram that shows nodes configured to send and receive requests for Target Content. An Intermediate Node 200 is configured to send and receive requests for Target Content 300. Intermediate Nodes 200, for example, proxy servers, were created at least in part to overcome censorship. Intermediate Nodes 200 may have a variety of configurations, capabilities, uses and placements, but need only be configured to respond to a request for Target Content 300 from a Requesting Node 100. Caching aside, a Node Request 400 sent from a Requesting Node 100 for Target Content 300 is not targeted at information typically stored locally by the Intermediate Node 200. Rather, the Node Request 400 is directed to information typically stored on yet another logical node, referred to herein as a Responding Node 600, which is physically or logically separate from the Intermediate Node 200. The Target Content 300 can be any content, for example, a service, a file, a connection, a web page, multimedia content or any other resource available over a network.

As another example, a user living in Los Angeles, Calif., representing a Requesting Node 100 may normally be blocked from obtaining Target Content 300, e.g., online TV, from a particular website which represents a Responding Node 600, because the website is configured to serve content only to users in the state of New York. Referring to FIG. 1, the user (at Requesting Node 100) may find an Intermediate Node 200 which requests the content from the Responding Node 600 from within the state of New York. The user sends a request for the content on the target website to the Intermediate Node 200, and the Intermediate Node 200 obtains the content, unrestricted in this example, from the target website and returns the content to the user in Los Angeles.

An Intermediate Node 200 may cache Target Content 300 obtained from the Responding Node 600 and still be considered an Intermediate Node 200 as long as the Requesting Node 100 is attempting to obtain the content data from the Responding Node 600. The data may be as simple as a low level communications request to check if a target server exists, or the data may be as complex as is supported on the communication path used and by the type of communications selected.

Nodes are logical constructs that can be physically implemented as discrete nodes, as part of other logical nodes or as a system. Requesting Nodes 100, Intermediate Nodes 200 and Responding Nodes 600 may exist at the same physical location, at completely disparate physical locations or at any combination thereof. Logical nodes may be comprised of different parts of a larger system, be themselves independent systems or be combined together in any combination. For example, a group of networked computers may each utilize a shared access point that is, itself, acting on behalf of a single logical node.

Many Intermediate Nodes 200 do not provide visibility to their data retrieval activities, and this lack of visibility causes difficulties with respect to the conventional use of Intermediate Nodes 200. Many Intermediate Nodes 200 do not provide the services that they purport to offer and, in fact, many nefarious Intermediate Nodes 200 cause more harm than any benefit they may provide. Harmful Intermediate Nodes 200 may download malicious content onto a Requesting Node 100, infiltrate the Requesting Node 100 by utilizing an array of techniques or promote the location of the Requesting Node 100 to dangerous third party groups. The Requesting Node 100 has almost no inherent protection from harmful Intermediate Nodes 200.

Moreover, using an Intermediate Node 200 through any sort of manual effort can be both technically challenging and time consuming for a typical end user. Intermediate Node 200 usage may require entries to be made in special sections of a Requesting Node's 100 operating system, file directory or some other configuration option, either directly or indirectly, and the only manner in which to determine if an Intermediate Node 200 is a viable and functional option is typically to use the Intermediate Node 200 and hope that nothing harmful occurs to the Requesting Node 100. Given the large number of Intermediate Nodes 200 providing intermittent connectivity, an end user may have to attempt to use hundreds or more of Intermediate Nodes 200 prior to finding a somewhat viable option.

Compounding these problems with the conventional use of Intermediate Nodes 200 is that an apparently functional Intermediate Node 200 may hide additional data within the Target Content 300 or perform actions beyond the scope of the Responding Node 600 that directly or indirectly affect the Requesting Node 100. While an end user may find an apparently functional Intermediate Node 200, through which requests for Target Content 300 are fulfilled, the end user may have no idea if the Intermediate Node 200 is also downloading malicious content or performing other potentially harmful operations. Furthermore, the end user has no way of knowing from which geographic region a given Intermediate Node 200 is sending out Content Requests 500 to the Responding Node 600. Overcoming censorship may rely on being perceived as requesting information from a distinct and safe geographic region but, given the conventional options in the market, choosing a specific location for an Intermediate Node 200 is not possible.

It should be noted that an end user is not required. Automated machine-to-machine communications, routing between systems, networking devices and other communication-related efforts may utilize an Intermediate Node 200 in place of an end user. An end user can, therefore, be a human, a computer, a program or some portion of code that produces a Node Request 400. Node Requests 400 may be generated directly or indirectly and with or without knowledge of the Intermediate Node 200. Content Requests 500 need not be defined as distinct or separate from the Node Requests 400, because the Content Request 500 can be a routed Node Request 400 or a context-based new message.

Utilizing an Intermediate Node 200 may aid in overcoming geography-based restrictions, and Intermediate Nodes 200 may provide additional benefits including, for example, cookie blocking, information compression and virus protection. However, communications between two or more nodes can be infiltrated, blocked, transformed or altered through some unwanted action by various mechanisms.

One known issue with communications between two nodes is referred to as "eavesdropping", which includes any activity that somehow intercepts and reads, processes, stores or interacts with communication not intended for the node perpetuating the activity. A conventional solution to protect against eavesdropping is to utilize some form of encryption, for example, Virtual Private Networks (VPN) or Secure Socket Layer (SSL). As programming capabilities increase in power, these conventional technologies can be overcome and no longer provide the level of protection that they once offered. Furthermore, VPN typically requires static, specialized nodes, referred to as VPN Servers, and such a static approach may preclude dynamic communications by an increasingly mobile audience.

Another common communications issue is one of discovery, which can lead to inadvertent loss of privacy. Even if a technology such as VPN is successful is protecting the data within a given communication, potentially unwanted observers can still determine a significant amount of information about the given communication by examining the nodes involved in the communication. For example, if a factious site is providing music downloads for a popular music group and a node obtains content from that site, an observer could determine that the node likely downloaded music from the music group without ever needing to decrypt the protected data in the communication.

Furthermore, a potentially unwanted observer may observe the communication protocol used for the communication to gain another level of insight into a communication between two nodes. In the previous example, the potentially unwanted observer may determine, for example, that an FTP protocol was used between the known music site and the Requesting Node 100, thereby providing more evidence to the observer that music was downloaded. There is no available option for protecting the Responding Node 600 and the communication protocol from unwanted observation.

There is a range of conventional options for virtualizing application interfaces over a network. However, one of the main issues with these conventional approaches is the use of specialized ports, known protocols, and the high bandwidth required to port across entire operating system environments. These types of communications are highly visible and are typically targeted for eavesdropping purposes.

Accordingly, a need for more comprehensive communications protection between nodes exists.

SUMMARY

It is an objective of example embodiments of the present disclosure to provide a more comprehensive suite of protective options for communications between two or more nodes.

Example embodiments provide a Packet Level Program that is configured to interact with communications down to the individual packet level, or the lowest level of data supported by a given communication protocol if packets are not used by the protocol. The Packet Level Program may interact with higher levels of the communication protocol without limitation. The Packet Level Program may utilize Intermediate Nodes to obtain Target Content from Responding Nodes, or the Packet Level Program may communicate directly with Packet Level Programs on other nodes in a unidirectional or a bidirectional manner. The Packet Level Program may communicate directly with nodes including Cryption Nodes.

The Packet Level Program may alter communication data including, for example, data compression, encryption, obfuscation or data splitting. Communication data is, for example, any text data, binary data or some combination thereof that can travel over a communication protocol, either between two nodes or within a logical node between two or more physical processes. A process is a specific object within a given node that obtains resources for some period of time including, for example, memory, processor time or file system access. In an example embodiment, a process may be a routine, application, script, service, computer, server, set of servers, program, code snippet, or some other object that utilizes resources on a given node.

The Packet Level Program may wrap one communication protocol within another, transform between communication protocols or map one or more communication protocols to one or more alternate protocols. The Packet Level Program may alter communications between two nodes in one communication direction only, or in both communication directions. For example, a Packet Level Program on a Requesting Node may embed a range of protocols into, for example, a standard web request. The standard web request may be sent directly or indirectly through an Intermediate Node to another Packet Level Program on a Responding Node. The Packet Level Program on the Responding Node may extract out the embedded protocol(s) prior to sending the communication to Computer Applications on the Responding Node.

BRIEF DESCRIPTION OF THE DRAWINGS

These and other objects, features and advantages of the present disclosure will be apparent from a consideration of the following Detailed Description considered in conjunction with the drawing Figures, in which.

DETAILED DESCRIPTION

Figure 1:
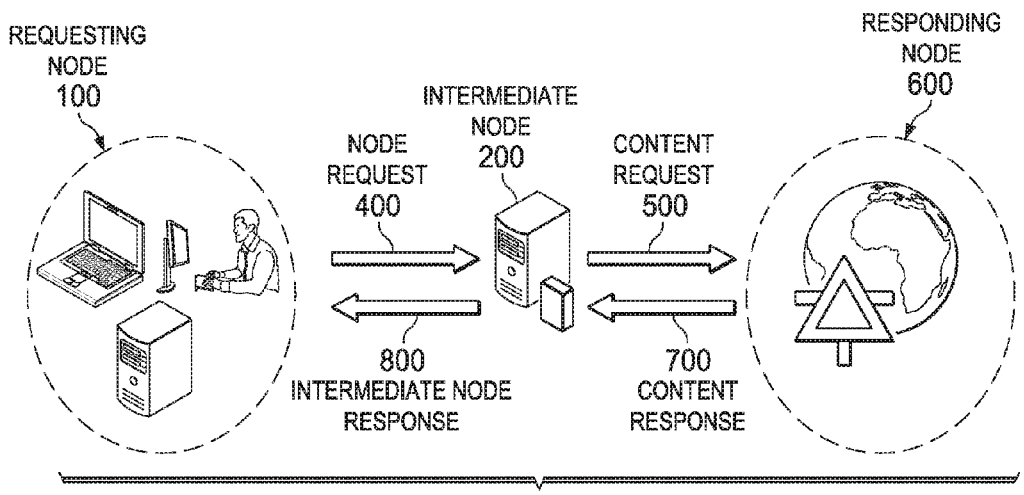
FIG. 1 is a schematic diagram that shows nodes configured to send and receive requests for Target Content.
Figure 2:
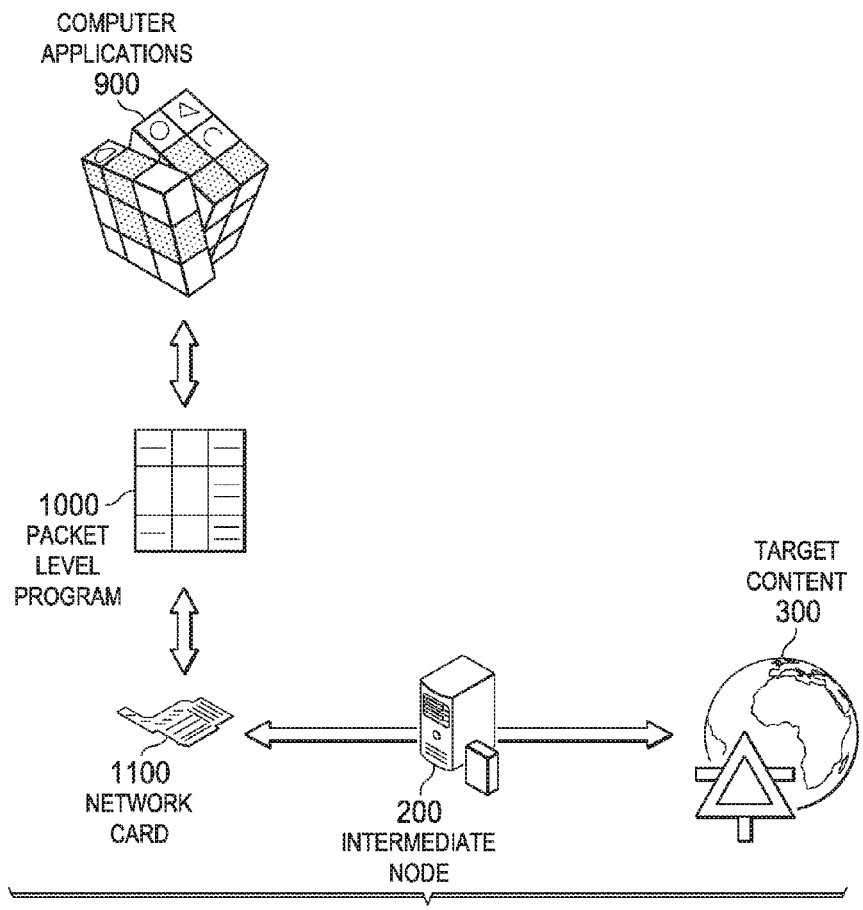
FIG. 2 is a schematic drawing showing a Packet Level Program that communicates through an Intermediate Node according to an example embodiment.

Referring to FIGS. 1 and 2, a Packet Level Program 1000 according to an example embodiment is an independent process that intercepts packets of information as the packets enter and leave a given Requesting Node 100. If a given communications protocol does not use packets, the packet Level Program 1000 interacts with the lowest level of available communication or formatted data for that protocol. For example, a pulse switching protocol utilizes pulses of light to encode messages. The Packet Level Program 1000 interacts with the pulses of light if the Packet Level Program 1000 is applied to intercept information from communications using a pulse switching protocol. Each pulse sequence may be processed internally by the Packet Level Program 1000 to determine the encoded message, the message is altered and a new set of light pulses are transmitted in turn. FIG. 2 provides a schematic overview of a Packet Level Program 1000 that communicates through an Intermediate Node 200 according to an example embodiment.

The Packet Level Program 1000 need only interact with a given packet prior to the packet being sent to a Network Interface Card 1100 from Computer Applications 900, and the Packet Level Program 1000 may interact with packets received from the Network Interface Card 1100 in a given operating system before sending the packets to the Computer Applications 900. Other hardware, for example, memory, hard drives and Network Interface Card 1100 specific drivers, may also interact with the packets.

The Packet Level Program 1000 may be a single program, a distributed system or some combination thereof. The packet Level Program 1000 may comprise a single driver on a given node, or the Packet Level Program 1000 may comprise two or more drivers on a single node. Alternatively, the Packet Level Program 1000 may comprise packet intake components on one node and packet processing on a different node. Another example embodiment of the Packet Level Program 100 may comprise a component for sending packets on one node and a component for receiving packets on another node. Example embodiments of the Packet Level Program 1000 may comprise components in a User Mode 1600 and/or a Kernel Mode 1700.

The Packet Level Program 1000 may comprise a driver that is situated directly on top of the Network Interface Card 1100, as will be explained in more detail below. Computer Applications 900, which are any routine, application, script, service, or program that sends packets out of a computer or receives packets from other nodes, may send the communications without knowledge of the Packet Level Program 1000. Computer Applications 900 send standard Content Requests 500 from a computer, (e.g., a Requesting Node 100), and the Packet Level Program 1000 transforms the outgoing Content Requests 500 into Node Requests 400. Similarly, incoming Intermediate Node Responses 800 to the Computer Applications 900 are converted by the Packet Level Program 1000 into standard Content Responses 700 prior to being sent to the Computer Applications 900. For example, a Computer Application 900 typically sends a Content Request 500 directly to a Responding Node 600, and the Computer Application 900 typically receives a Content Response 700 back from the Responding Node 600. However, a Packet Level Program 1000 according to example embodiments may invisibly (to the Computer Application 900) inject a Node Request 400 into the communication path of the Content Request 500 and translate the resultant Intermediate Node Response 800 without the Computer Application 900 ever realizing any modification of the communication path occurred.

Figure 3:
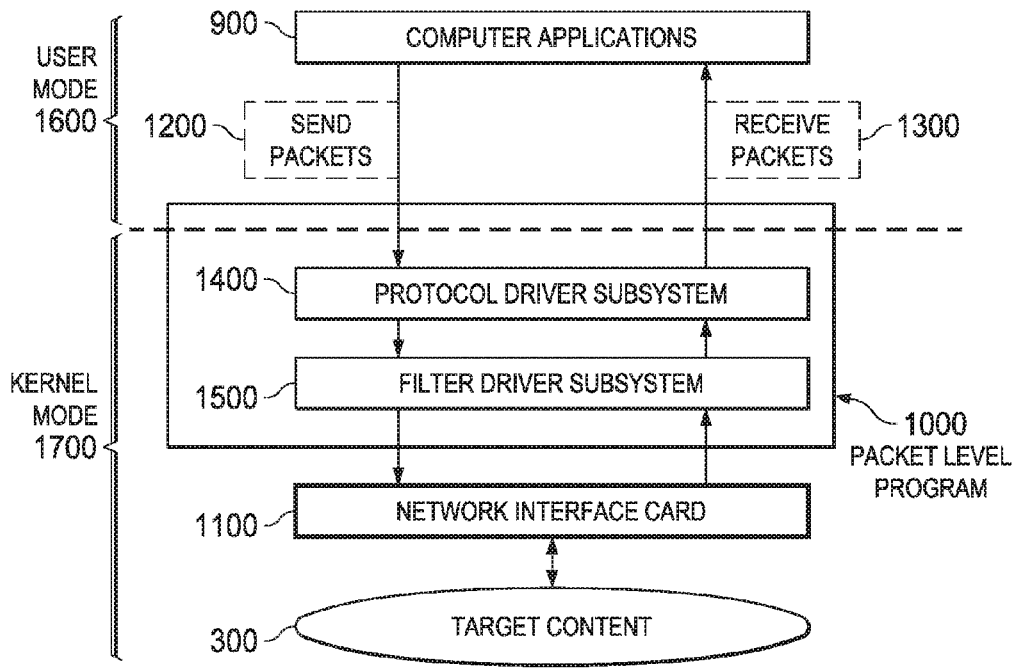
FIG. 3 is a block diagram illustrating a Packet Level Program according to an example embodiment.

FIG. 3 provides more a detailed illustration of a Packet Level Program 1000 according to an example embodiment. The Packet Level Program 1000 may include a Protocol Driver Subsystem 1400 and a Filter Driver Subsystem 1500. Send Packets 1200 from Computer Applications 900 enter the Protocol Driver Subsystem 1400 of the Packet Level Program 1000. The Send Packets 1200 are sent to the Filter Driver Subsystem 1500 of the Packet Level Program 100 from the Protocol Driver Subsystem 1400. The Filter Driver Subsystem 1500 transforms the Content Requests 500 into Node Requests 400.

An example of the Protocol Driver Subsystem 1400 and the Filter Driver Subsystem 1500 in the form of NDIS is now provided for descriptive purposes; however, one skilled in the art will recognize that that the Protocol Driver Subsystem 1400 and the Filter Driver Subsystem 1500 are not limited to a NDIS application. The Network Driver Interface Specification (NDIS) is an application programming interface (API) for network interface cards (NICs). NDIS was jointly developed by Microsoft Corporation and 3Com Corporation, and is mainly used in Microsoft Windows. However, the open-source NDIS wrapper project allows many NDIS-compliant NICs to be used with Linux, FreeBSD and NetBSD. Moreover, magnussoft ZETA, a derivative of BeOS, supports a number of NDIS drivers.

The NDIS is a Logical Link Control (LLC) that forms an upper sublayer of an Open Systems Interconnection (OSI) data link layer (layer 2 of 7) and acts as an interface between layer 2 and layer 3 (the Network Layer). The lower sublayer is the Media Access Control (MAC) device driver. The NDIS is a library of functions often referred to as a "wrapper" that hides the underlying complexity of the NIC hardware and serves as a standard interface for level 3 network protocol drivers and the hardware level MAC drivers. Another common LLC is the Open Data-Link Interface (ODI).

Using a NDIS system as an example, TCP/IP packets may enter the send packet handler of the NDIS filter driver from the upper level Protocol driver. The Protocol driver receives its TCP/IP packets from user level applications, for example, web browsers and email clients. These packets leave the Protocol driver with, amongst multiple other fields, an identifying sequence number, a destination IP address and a destination port number. Note that these fields are specific to this representative example and other example embodiments may have different and/or additional fields. The NDIS driver redirects the packets to a proxy server by changing the fields and performing HTTP data reformatting including re-computing cyclical redundancy checks (CRC) at all required layers. The field information is kept for the duration of a connection request.

TCP/IP packets enter the receive packet handler from the lower level network interface card driver. The network interface card driver receives the packets from the wide area network (e.g., the Internet). The packets have the same fields modified so that the upper level Protocol driver knows that the packets originated from its stack. The modified fields may include the original destination IP address, the original destination port number and what would be the sequence number had this connection not been redirected.

After the requisite fields are modified, and any optional CRC re-computing completed, the packets are forwarded to the original requesting Computer Application 900.

1. Communication Virtualization

Figure 4A:
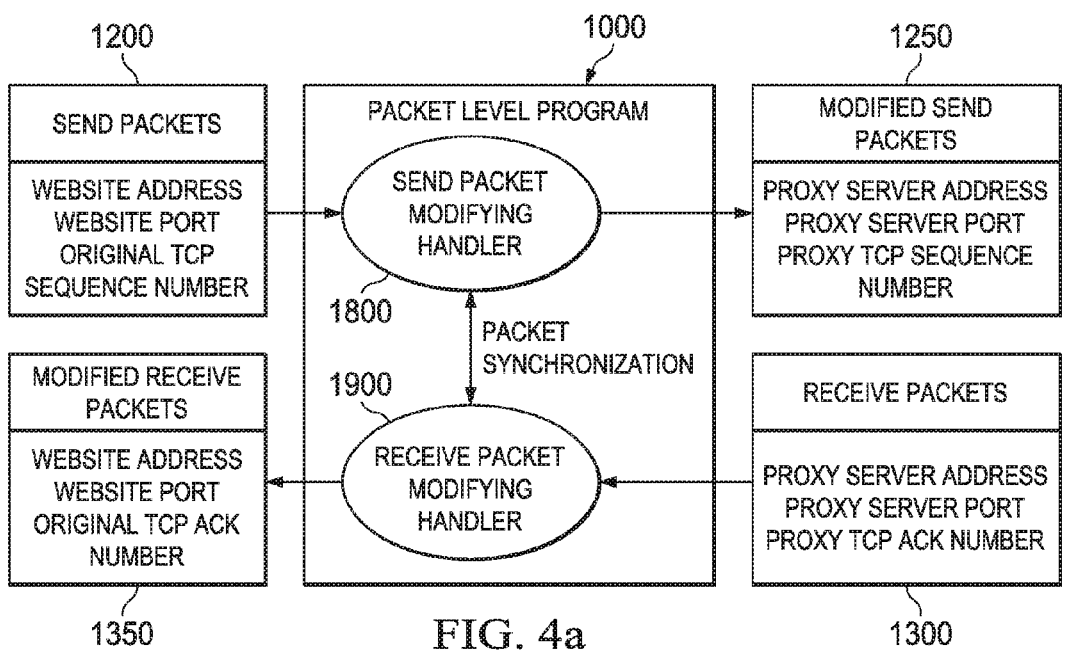
FIG. 4a is a block diagram illustrating a Communication Virtualization Process according to an example embodiment.

A system according to an example embodiment has an ability to handle communications between the Computer Applications 900 and the Packet Level Program 1000 and communications between the Packet Level Program 1000 and other logical nodes. FIG. 4a illustrates an example embodiment of a system including a Packet Level Program 1000 configured to interact with TCP packets. A Website Address and Port containing the Target Content 300 in a Send Packet 1200 sent from the Computer Applications 900 are moved to other TCP Header fields and the two fields originally containing the Website Address and Port are replaced with an Intermediate Node 200 Address and Port by a Send Packet Modifying Handler 1800 in the Packet Level Program 1000. The Packet Level Program 1000 thus transforms the Send Packet 1200 into a Modified Send Packet 1250 including a proxy server address, a proxy server port and a proxy TCP sequence number of the Intermediate Node 200 in place of the original Website Address, the original Website Port and the original TCP sequence number for the Target Content 300. Each TCP communication requires a unique TCP Sequence Number to ensure packets are not missed. The Filter Driver Subsystem 1500 therefore first communicates with a target Intermediate Node 200 to obtain a given Sequence Number which is subsequently used to transform the Content Request 500 into a Node Request 400 by the Packet Level Program 1000, i.e., to transform the Send Packets 1200 into the Modified Send Packets 1250.

As shown in FIGS. 3 and 4, the above described process is reversed for TCP packets sent to the Computer Applications 900, and a Node Response 800 is transformed into a Content Response 700 by the Packet Level Program 1000. A Receive Packet Modifying Handler 1900 in the Packet Level Program 1000 transforms a Receive Packet 1300, which includes a proxy server address, a proxy server port and a proxy TCP ACK number of an Intermediate Node, into a Modified Receive Packet 1350 including the original Website Address, original Website Port and the original TCP ACK number The Protocol Driver Subsystem 1400 and the Filter Driver Subsystem 1500 may be required for the Packet Level Program 1000 for a particular operating system. However, different operating systems and Requesting Nodes 100 may have different requirements, and the Packet Level Program 1000 need only be configured to modify all incoming and outgoing packets of information. That is, the Packet Level Program 1000 need not include the Protocol Driver Subsystem 1400 and the Filter Driver Subsystem 1500 depending on the operating system and Requesting Node 100 to which the Packet Level Program 1000 is applied. When using the term transfer control protocol (TCP) herein, there are no restrictions in terms of IPv4 versus IPv6, nor are UDP and TCP the only types of packets that can be intercepted by a Packet Level Program 1000 according to example embodiments. Any packet of information that contains a discernible URI in a readable format is a candidate packet for the Packet Level Program 1000.

The TCP Sequence numbers (or the sequence numbers for whatever packet type is utilized for the communications to and from the Computer Applications 900) are synchronized between the two disconnected sets of communications, i.e., between the Send Packets 1200/1250 and the Receive Packets 1300/1350. For example, the TCP Sequence between a Computer Application 900 and the Packet Level Program 1000 may start at 0, and the TCP Sequence between the Packet Level Program 1000 and a Responding Node 600 may start at the number 500. Numbers are used for purely illustrative reasons and do not impart any of limitation on example embodiments, as will be recognized by one of skill in the art. When the Computer Application 900 sends a first TCP packet as part of a Content Request 500, the Packet Level Program 1000 records the sequence number of the first TCP packet and sends out a Node Request 400 with a starting TCP sequence number of 500. If, for example, the Content Request 500 uses 50 packets, the final sequence number is 50 for communications between the Computer Application 900 and the Packet Level Program 1000. On the Node Request 400 side, if, for example, 60 packets are used to send the Node Request 400, the final TCP sequence number is 560 for communications between the Packet Level Program 1000 and the Responding Node 600. There is no restriction on sizes of the Content Request 500 and the Node Request 400 being the same size or different sizes. When a node response comes back to the Packet Level Program 1000 from the Responding Node 600, in the present example, the TCP Sequence Number of the first packet is 561. The Packet Level Program 1000 thus sends a Content Response 700 to the Computer Application 900 starting with a TCP sequence number of 51. Again, the above example of TCP sequence number synchronization is intended to provide insight into a Communications Virtualization process according to an example embodiment and does not impart any restriction on how the synchronization or sequencing must occur for a given communication protocol.

By utilizing a packet-level approach to handling Intermediate Node 200 redirection, an entire new architecture can be supported wherein upper level Computer Applications 900 can operate without having any knowledge of the Intermediate Nodes 200. Conventional utilization of Intermediate Nodes 200 required specific alteration, configuration or modification of Computer Applications 900, which was time-consuming and often not possible. While alternative technologies such as Virtual Private Networks (VPN) do offer other, non-Intermediate Node 200 options, these conventional technologies come with their own limitations including high visibility and ease of blocking. By invisibly redirecting standard requests through Intermediate Nodes 200, anonymous traffic benefits can be obtained without these detractions.

A packet-level approach to handling Intermediate Node 200 redirection, as will be shown in further detail below, opens up the ability to provide additional layers of communication protection not possible with other approaches. For example, multicast secured communications utilizing low-level packet encryption may provide superior protection for communications without requiring expensive hardware systems such as VPN servers. Furthermore, the ability to interact at such a lower level enables options including, for example, protocol masking and recipient obfuscation techniques, described more fully in later sections, which support additional security layers.

Figure 4B:
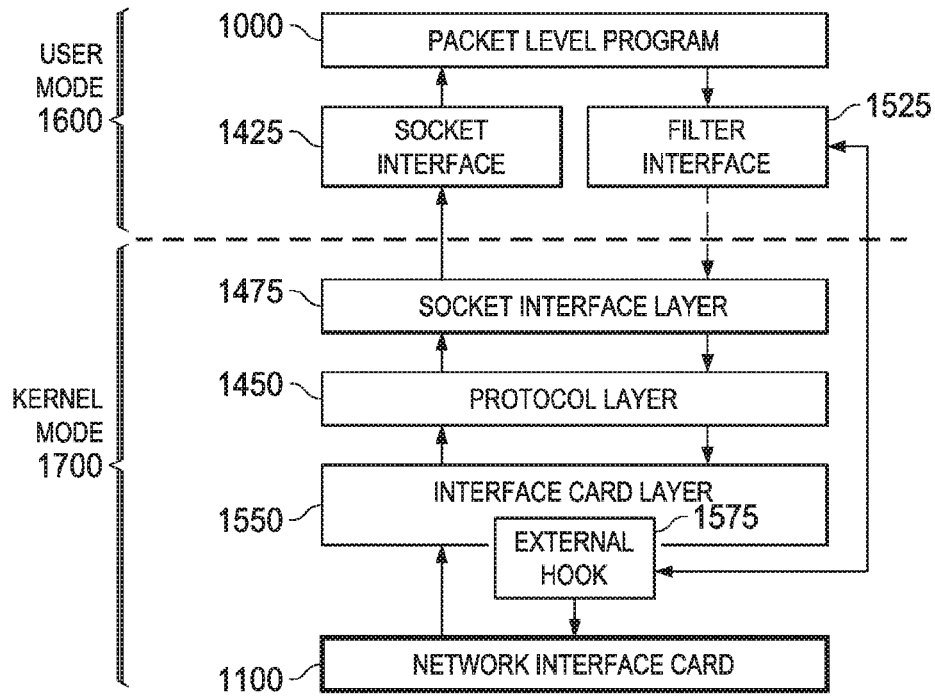
FIG. 4b is a block diagram illustrating a Packet Level Program according to another example embodiment.

FIG. 4b provides another example embodiment in which the Packet Level Program 1000 is executed completely in the User Mode 1600. The native layers of a particular operating system operate in Kernel Mode 1700 without any part of the packet Level Program 1000 running in between or on top of these layers. For example, the Socket Interface Layer 1475 may be translated as a WinSocks layer which is the Windows Socket API for interacting with specific packets of communication. The Protocol Layer 1450 may be a TCP/IP or UDP layer responsible for handling the types of communications associated therewith, and an Interface Card Layer 1550 may be implemented as NDIS. Individual implementation details of the Packet Level Program 1000 executed completely in the User Mode 1600 are not relevant to example embodiments as long as the native layers of the operating system are running without any Packet Level Program 1000 components.

If the Packet Level Program 1000 is executed completely in the User Mode 1600, either the native Interface Card Layer 1550 provides an External Hook 1575 or the hook is manually created to insert packets of data into the outbound communications stream. The Packet Level Program 1000 may intercept all inbound and outbound packets of communication. According to optional rules, the Packet level Program 1000 may send the intercepted packets directly to the Socket Interface Layer 1475 unmodified or processing the packets as described previously and use a Filter Interface 1525 to inject those modified packets through the External Hook 1575 into the outbound stream.

The Filter Interface 1525 and External Hook 1575 can be provided directly by the operating system, built as part of the Packet Level Program 1000 or some combination thereof. The Filter Interface 1525 may be as robust as required and need only enable modified communications packets to be sent to the External Hook 1575. The External Hook 1575 may encompass any additional levels of functionality desired and need only enable the injection of packets into the outbound communications stream immediately prior to the packets entering the Network Interface Card 1100.

The inbound packets pass back up through the native layers without any interaction from the Packet Level Program 1000 until they enter the User Mode 1600 at which time each packet enters the Packet Level Program 1000. As described previously, the Packet Level Program 1000 may modify the packets prior to sending the packets/stream to the upper level Computer Applications 900.

The Socket Interface 1425 may be implemented using technologies including, for example, Layered Service Provider (LSP). LSP is a feature of the Microsoft Windows Winsock 2 Service Provider Interface (SPI). A Layered Service Provider is a DLL that uses Winsock APIs to insert itself into the TCP/IP protocol stack. Once in the stack, a Layered Service Provider intercepts and modifies inbound and outbound Internet traffic and allows for processing of all the TCP/IP traffic taking place between the Internet and the applications that are accessing the Internet (e.g., a web browser, the email client, etc.).

Figure 4C:
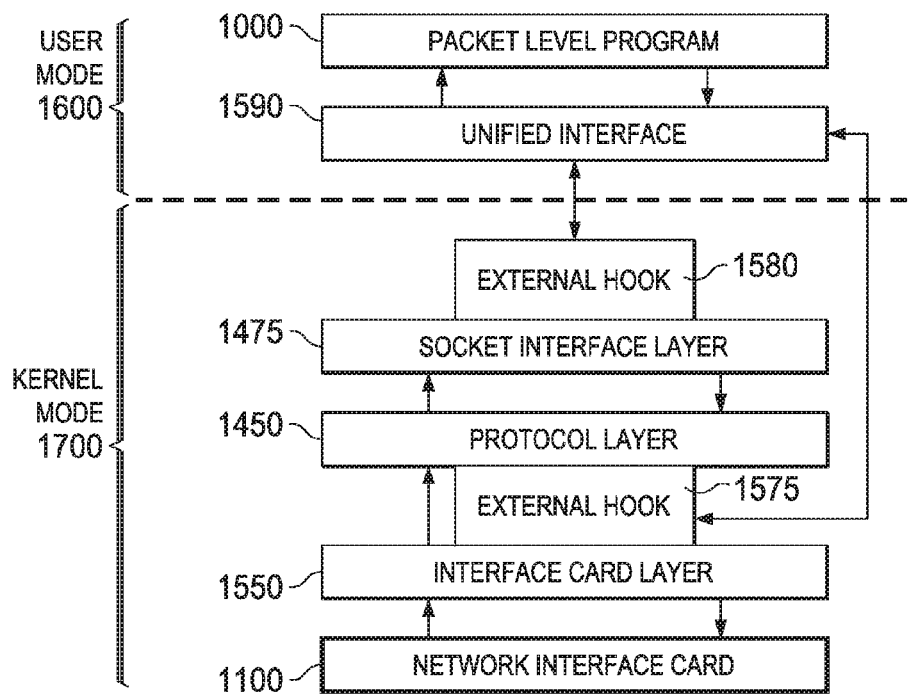
FIG. 4c is a block diagram illustrating a Packet Level Program according to still another example embodiment.

FIG. 4c shows an alternative example embodiment to the example embodiment shown in FIG. 4b. According to an example embodiment shown in FIG. 4c, more than one External Hook 1575/1580 may be implemented and the multiple hooks do not need to be embedded directly within a given layer. Rather, an individual External Hook 1575 or 1580 may, itself, be a layer. Further, the Socket Interface 1425 and Filter Interface 1525 may be logical constructs and, as such, may be implemented as a single Unified Interface 1590 which handles all communications to and from the Kernel Mode 1700 Layers.

The Windows Filtering Platform (WFP) may be utilized for the Unified Interface 1590 and the External Hooks 1575 and 1580. Windows Filtering Platform (WFP) is a set of API and system services that provide a platform for creating network filtering applications. The WFP API allows developers to write code that interacts with the packet processing that takes place at several layers in the networking stack of the operating system. Network data may be filtered and modified before the network data reaches its destination. By providing a simpler development platform, WFP is designed to replace previous packet filtering technologies, such as Transport Driver Interface (TDI) filters, Network Driver Interface Specification (NDIS) filters, and Winsock Layered Service Providers (LSP).

The Unified Interface 1590 may be implemented as a WFP Interface and may use callout drivers as its external hooks. A callout driver implements one or more callouts. Callouts extend the capabilities of the Windows Filtering Platform by processing TCP/IP-based network data in a manner that is beyond the scope of the simple filtering functionality. A callout can, for example, perform modification and reinjection of the network packet headers or data, or both. A network address translation (NAT) product, for example, may modify the headers on IPv4 packets.

If WFP is not employed by an example embodiment, the External Hook 1575 may be implemented as a Protocol WFP Callout Driver which enables the functionality of the Protocol Driver Subsystem 1400 in User Mode 1600. The External Hook 1580 may be implemented as a WinSock WFP Callout Driver which enables the functionality of the Filter Driver Subsystem 1500. These specific example are provided in order to clarify possible functional options and to demonstrate the flexibility and diversity of how the logical Packet Level Program 1000 may be implemented across User 1600 and Kernel 1700 Modes; however, one skilled in the art will readily recognize that example embodiments may be implemented in various other operating systems and devices and without other physical restrictions therein.

2. Shared Memory

A Packet Level Program 1000 according to another example embodiment may reside as a physical manifestation, for example, as a chipset or embedded ROM on a router. Alternatively, the Packet Level Program 1000 may exist or be executed in a particular region of an operating system, for example, in a Kernel Mode 1700 or a User Mode 1600 of the operating system. Furthermore, as described below, the Packet Level Program 1000 may exist across multiple operating system regions or the Packet Level Program 1000 may exist completely outside an operating system. Different operating systems have differing mechanisms for controlling access to resources and, if the Packet Level Program 1000 exists at a particular level, the Packet Level Program 1000 is configured to access required resources accordingly.

In one example of a division of resources, the Packet Level Program 1000 may exist or be executed in a User Mode 1600 and a Kernel Mode 1700 of an operating system. The User Mode 1600 may be a region of the operating system where most Computer Applications are loaded and that provides relatively large amounts of memory, disk space and other such resources. The Kernel Mode 1700 may be a region of the operating system that is significantly restricted on such resources as memory, disk space etc., but runs much faster, is more highly protected, and includes low level programs, e.g., drivers.

At least two reasons exits for presenting a Packet Level Program 1000 according to example embodiments across multiple operating system regions. First, the Packet Level Program 1000 is a logical construct that may be physically comprised of numerous pieces of code, applications, drivers, systems or other distributed or non-distributed components are that required to support its main functionality. By presenting the Packet Level Program 1000 across the two regions, a separation of possible physical implementations from the logical construct is highlighted. Second, the Packet Level Program 1000 may require access to resources restricted to one region, e.g., the Kernel Mode 1700, while requiring additional resources that are only available in another region, e.g., the User Mode 1600. For example, in some operating systems, the Kernel Mode provides direct access to communications directly prior to said communications leaving a given node, and the Packet Level Program 1000 may be required to exist/execute in the Kernel Mode 1700 in order to access the data at this point in the communication process.

The Kernel Mode 1700, however, may place restrictions on an amount of maintainable memory and a level of access allowed from other regions, e.g., the User Mode 1600. If the Packet Level Program 1000 provides a communications virtualization capability, as discussed above, which may require more memory than is supported in the Kernel Mode 1700, a component of the Packet Level Program 1000 may be needed in the User Mode 1600. Furthermore, as discussed below, additional applications may be layered on top of the Packet Level Program 1000, which may require more access to the Kernel Mode 1700 components of the Packet Level Program 1000 than is typically allowed. Accordingly, a Packet Level Program 1000 according to example embodiments includes components in both the User Mode 1600 and the Kernel Mode 1700 of an operating system.

Figure 5:
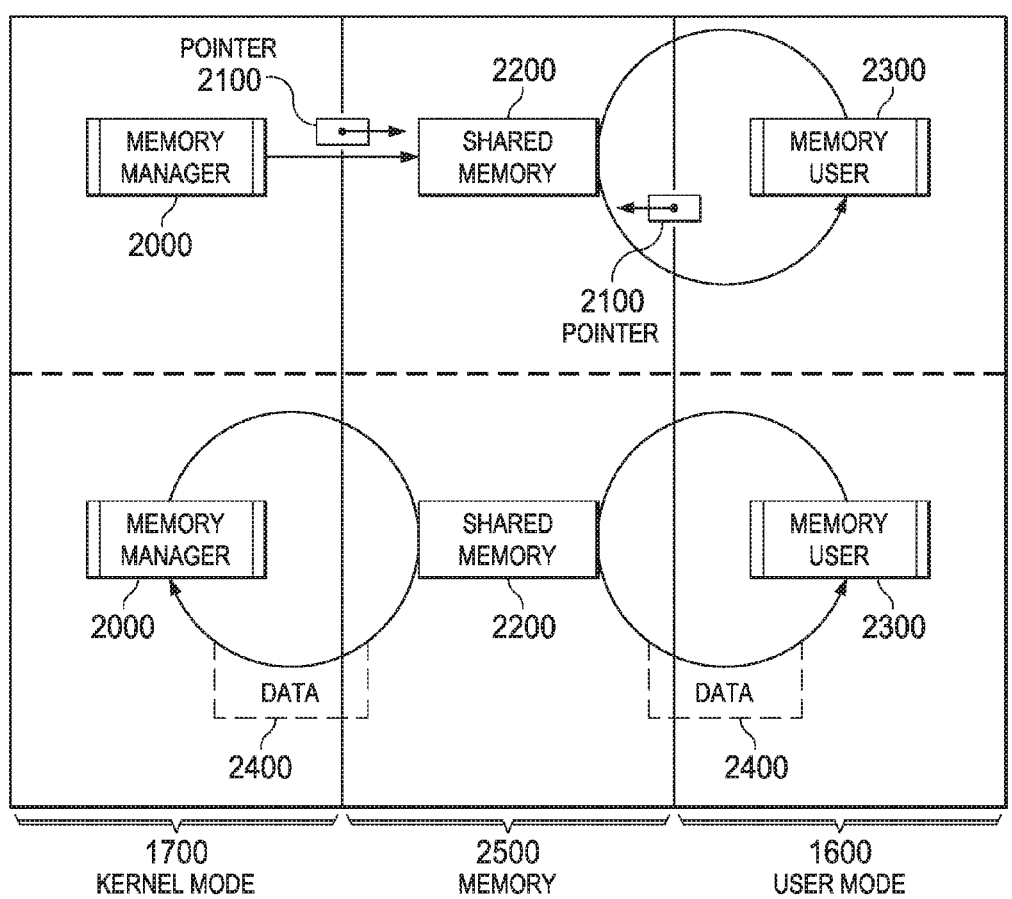
FIG. 5 is a block diagram illustrating memory sharing between a User Mode and a Kernel Mode according to an example embodiment.

FIG. 5 is a block diagram illustrating memory sharing between a User Mode 1600 and a Kernel Mode 1700 of a Packet Level Program 1000 according to an example embodiment. The Packet Level Program 1000 bridges the two modes of the operating system and, for example, enables the functionality of a driver in the Kernel Mode 1700 while maintaining the resources normally associated with Computer Applications 900 in the User Mode 1600.

As shown in FIG. 5, User Mode 1600 processes and Kernel Mode 1700 processes use a Shared Memory 2200 space to enable communications. The Shared Memory 2200 may comprise any resource that can be accessed by two discrete processes and includes, for example, Heap or Stack Memory, I/O or File Systems, Binary or Text Service Calls, shared data systems and managed memory access, e.g., through a queue. Moreover, the Shared Memory 2200, as a logical construct, may exist or be instantiated within the same computer or the Shared Memory 2200 may be configured to enable communications across multiple computers. If the Shared Memory 2200 is configured to enable communications across multiple computers, a User Mode 1600 process may be a logical construct wherein a range of nodes collectively provide additional resources and data to the Kernel Mode 1700 process.

As shown in FIG. 5, a Memory Manager 2000 opens or accesses a specific address in Memory 2500 using a Pointer 2100 that is known to processes in both the Kernel Mode 1700 and the User Mode 1600. In an example embodiment, the Pointer 2100 is programmed directly into the Packet Level Program's 1000 processes. In alternative example embodiments, external configuration files or communications from other nodes are utilized to synchronize the Pointer 2100 information between the Kernel Mode 1700 processes and the User Mode 1600 processes. Although FIG. 5 shows the Kernel Mode 1700 process of the Project Level Program 1000 using the Pointer 2100 to first access the Shared Memory 2200, the Shared Memory 2200 may instead be first accessed by the User Mode 1600 process of the Project Level Program 1000 or exist or be executed independently of either mode and, itself, synchronize Pointers 2100.

The Pointer 2100 may be a pointer in the well-known classic sense, i.e., a specialized operating system address of an object. Alternatively, the Pointer 2100 may be a URI, or the Pointer 2100 may contain complex information required, for example, to access a secured queue or web service. However, Pointer 2100 need only provide sufficient information to locate a process, e.g., the Shared Memory 2200.

A Memory User 2300 may monitor the Memory 2500 using the Pointer 2100. If the Pointer 2100 returns access to the Shared Memory 2200, the Memory User 2300 can maintain a connection to the Shared Memory 2200. The Memory Manager 2000 may perform a similar monitoring process. This optional initialization and monitoring process, as different types of shared communications may preclude this step, is shown above the dotted line at the top of FIG. 5.

The section below the dotted line in FIG. 5 shows how communications subsequent to any initialization occur between the Kernel Mode 1700 processes and the User Mode 1600 processes of the Packet Level Program 1000. Data 2400 may be sent to and stored in the Shared Memory 2200 by one of the Kernel Mode 1700 processes and the User Mode 1600 processes, and retrieved on the other end by the other of the Kernel Mode 1700 processes and the User Mode 1600 processes. The Data 2400 may be any resource that can be stored in memory and accessed by a process on the other end/mode. The Data 2400 is not limited to text and/or binary transmissions but may include, for example, instantiated objects as Pointers 2100 that can be sent to Shared Memory 2200, complex workflow instructions via shared data sets, preconfigured instructions or some other trigger, and communications meant for third parties.

Figure 6:
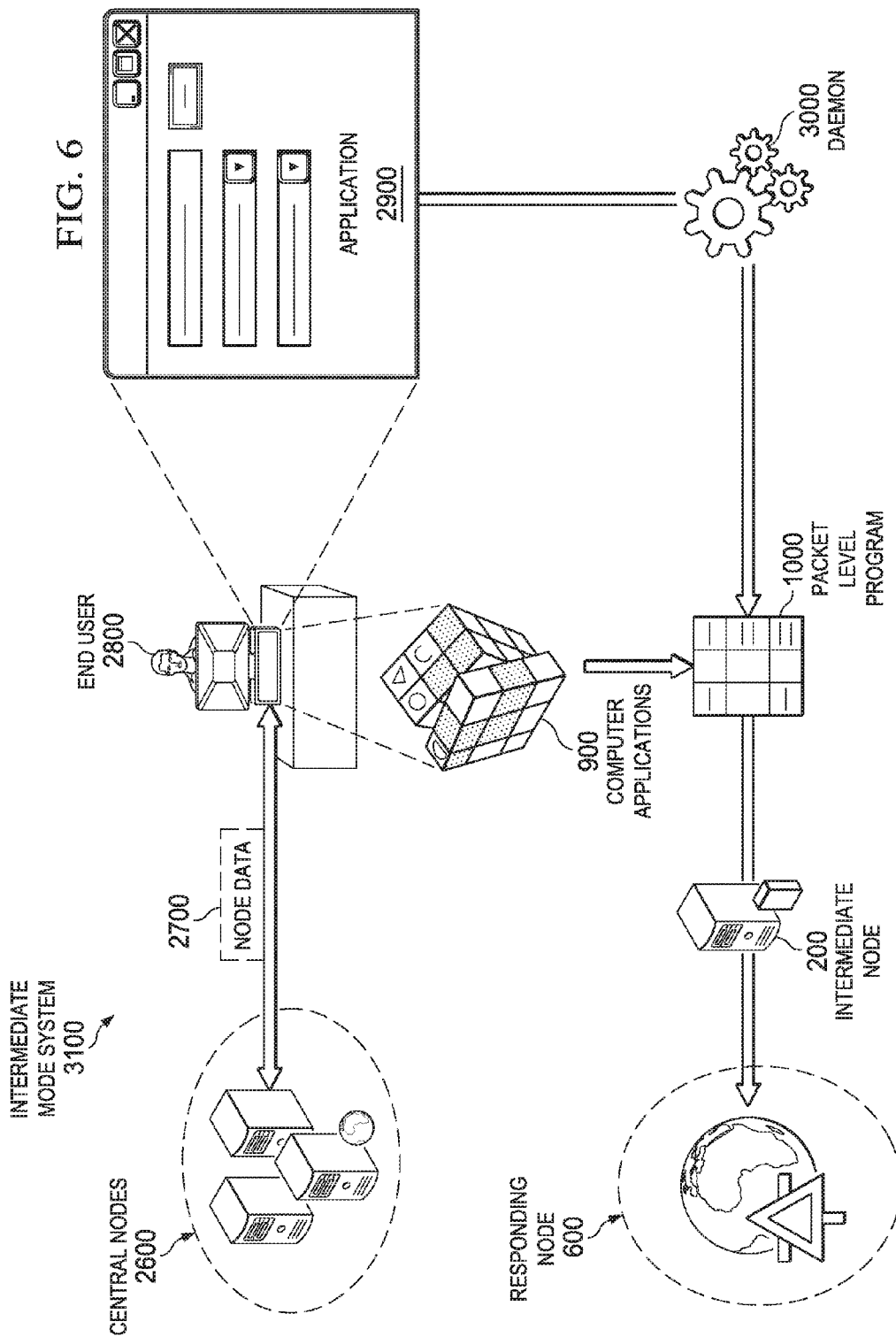
FIG. 6 is a schematic overview of an Intermediate Node System according to an example embodiment.

For example, in an example embodiment as shown in FIG. 6 below, a Daemon 3000 may use the Memory User 2300 to send Data 2400 that causes the Packet Level Program 1000 to verify connectivity to a target location, e.g., a possible Intermediate Node 200. The Packet Level Program 1000 attempts to connect to the target location provided by the Daemon 3000 and sends back the results of the connection attempt to the Daemon 3000. If the Daemon 3000 determines that the connectivity is insufficient according to an optional set of business rules or thresholds, the Daemon 3000 sends the Data 2400 through the Memory User 2300 to the Memory Manager 2000 to cause the Packet Level Program 1000 to change its target Intermediate Node 200.

Example embodiments illustrated in FIGS. 5 and 6 do not require the use of an Intermediate Node 200. Furthermore, the Packet Level Program 1000 is not restricted to sending Node Requests 400 as communications may occur with a multitude of node options that include, for example, Cryption Nodes 3900, Partner Nodes and Packet Level Programs 1000 that exist on other logical nodes.

3. Intermediate Node System

FIG. 6 is an overview of a system that utilizes externally-obtained Node Data 2700 and a Packet Level Program 1000 according to an example embodiment to provide an Intermediate Node System 3100. Although FIG. 6 shows several servers grouped together as Central Nodes 2600, this is for illustrative purposes and example embodiments are not limited thereto. The Central Nodes 2600 may be a single node, multiple nodes or a distributed network of nodes spread throughout logical and/or geographic locations including cloud-based nodes, collocated nodes and virtual private node instances. In an example embodiment, the Central Nodes 2600 may comprise nodes in a peer-to-peer network, and may be Requesting Nodes 100 that further act as Responding Nodes 600 for other Requesting Nodes 100.

Figure 9:
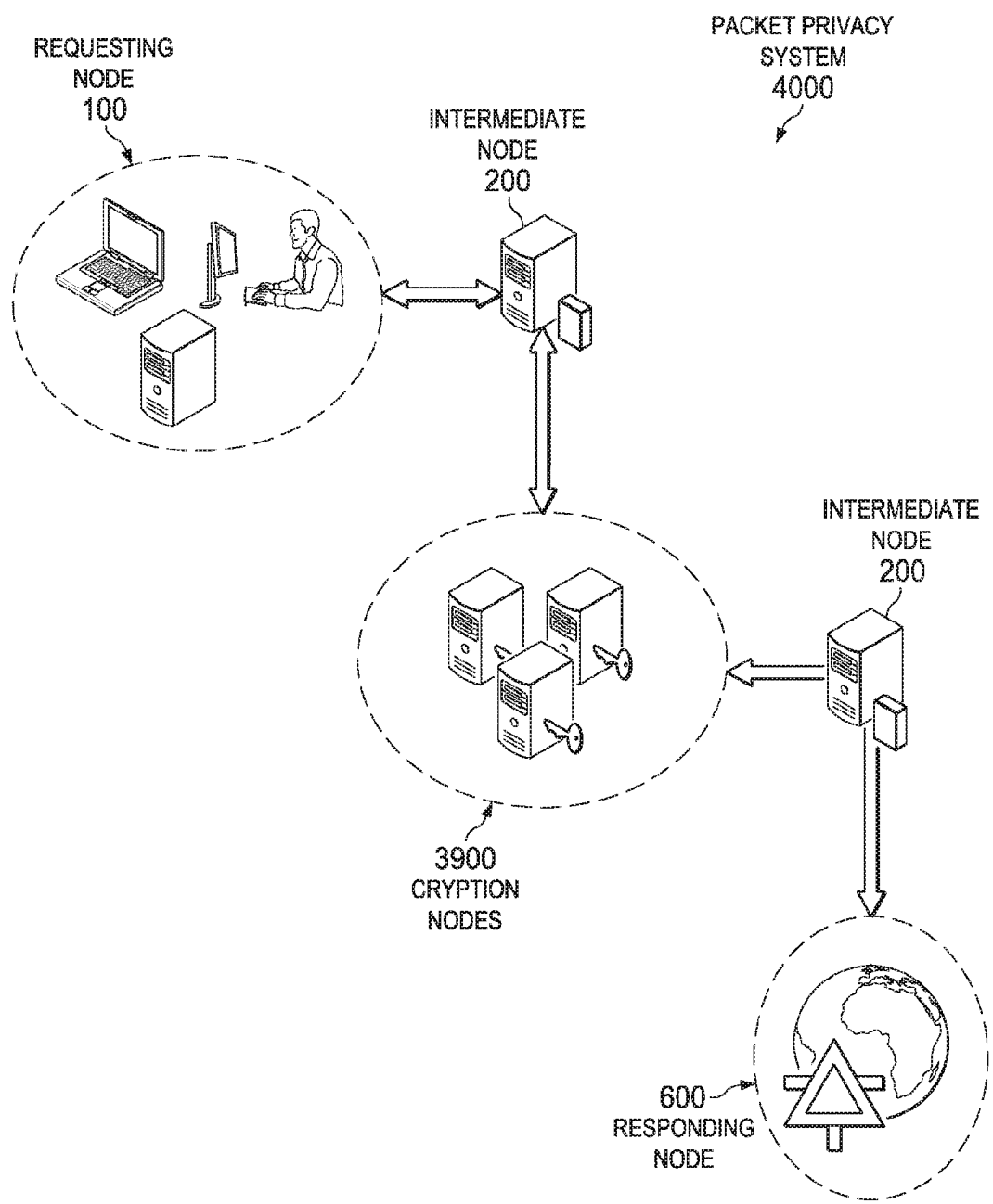
FIG. 9 is a schematic overview of a Packet Privacy System according to an example embodiment.

As shown in FIG. 6, a Computer Application 2900 is used and/or executed by an End User 2800 to request Node Data 2700 from the Central Nodes 2600. It should be noted that the requested Node Data 2700 is not restricted to Node Data 2700 from the Central Nodes 2600 and can be requested from other nodes, e.g., Cryption Nodes 3900 (see FIG. 9) or other instances of the Packet Level Program 1000, alternative example embodiments of which are described more fully in subsequent sections below.

The Computer Application 2900 enables the End User 2800 to select specific geographic locations, e.g., at a country level, a regional level and/or a city level, and obtain Node Data 2700 for nodes in the selected region. In response to the End User 2800 selection, the Computer Application 2900 may send a request to the Central Nodes 2600 for Node Data 2700 for Intermediate Nodes 200 specific to the region selected. It should be noted that the End User 2800 may choose to be within a specific region or the end user may choose to exclude a specific region and those selections, in turn, may be used to request the Node Information 2700.

In further example embodiments, additional information of Intermediate Nodes 200 may be sent to the Central Nodes 2600. For example, an anonymity level provided by the Intermediate Node 200 and the types, modes and levels of communications supported by the Intermediate Node 200 may be sent to the Central Nodes 2600. Furthermore, the criteria for selecting the Node Data 2700 may request only Intermediate Nodes 200 that completely hide the Requesting Node's 100 identifying information and that can support multimedia streaming and form submissions (e.g., HTTP POST). A method for sending the criteria for selecting the Node Data 2700 and the actual criteria utilized may vary as will be recognized by one of skill in the art.

Other example embodiments may be configured to send the Node Data 2700 to the Computer Application 2900 independent of regional filters, and the additional criteria may be used as upfront filters. The Computer Application 2900 may apply its own set of regional filters depending on End User 2800 selections.

Still other example embodiments may employ a combination of the above two approaches to enhance application responsiveness. For example, an example embodiment may utilize additional filters and a country-level filter to provide a large set of Node Data 2700 for an entire country to the Computer Application 2900. In response to End user 2800 selections, the Computer Application 2900 may additionally apply regional and/or city-level filters to the local set of Node Data 2700. The Computer Application 2900 in any of these embodiments may utilize user-friendly controls including, for example, dropdown lists, to enable ease of geographic selection; however, example embodiments are not limited thereto. The Node Data 2700 is sent to the Packet Level Program 1000 via an optional Daemon 3000.

The Daemon 3000 may represent a portion of the Packet Level Program 1000 that resides or is executed in the User Mode 1600 of the operating system employed by the End User 2800. The Daemon 3000, which may be, for example, a service callable component, e.g., a DLL or some other process, may store all of the incoming Node Data 2700 in memory for faster access and monitor the traffic flowing through the Packet Level Program 1000 to monitor for Intermediate Node 200 issues.

The Daemon 3000 may send its own independent requests through the Intermediate Node 200 to verify connectivity. In other example embodiments, the Daemon 3000 may monitor packets flowing through the Packet Level Program 1000 and, based on optional sets of hard-coded, configurable and/or dynamic business rules, determine if a given Intermediate Node 200 is not acting properly. For example, the rules may be based around issues and thresholds set based thereon including, for example, total response time, percent of packet loss, cyclical request loops and other signs that communications through the Intermediate Node 200 are not behaving as expected. Further example embodiments including the Daemon 3000 may monitor operating system events to trap for common communication issues. For example, Internet Connectivity failures elicited by a web browser may by obtained by the Daemon 3000 and used to determine when to move to a new Intermediate Node 200 for communications.

In an example embodiment, the Daemon 3000 proactively causes the Packet Level Program 1000 to use different Intermediate Nodes 200 for various types of communication and/or changes the Intermediate Nodes 200 to be used for communications by the Packet Level Program 1000 in response to connectivity issues or optional business rules and/or thresholds. For example, the Daemon 3000 may randomly change Nodes 200 at periodic intervals to increase End User 2800 anonymity.

If a Daemon 3000 is not used or included, the above-described functionality associated with the Daemon 2000 may instead be included in the Packet Level Program 1000 or in the Computer Application 2900. Such a simplified approach may be observed in stricter environments including, for example, mobile platforms wherein too many active parts can cause resource issues, e.g., battery drain.

4. Noninvasive Encryption Approach

Figure 7:
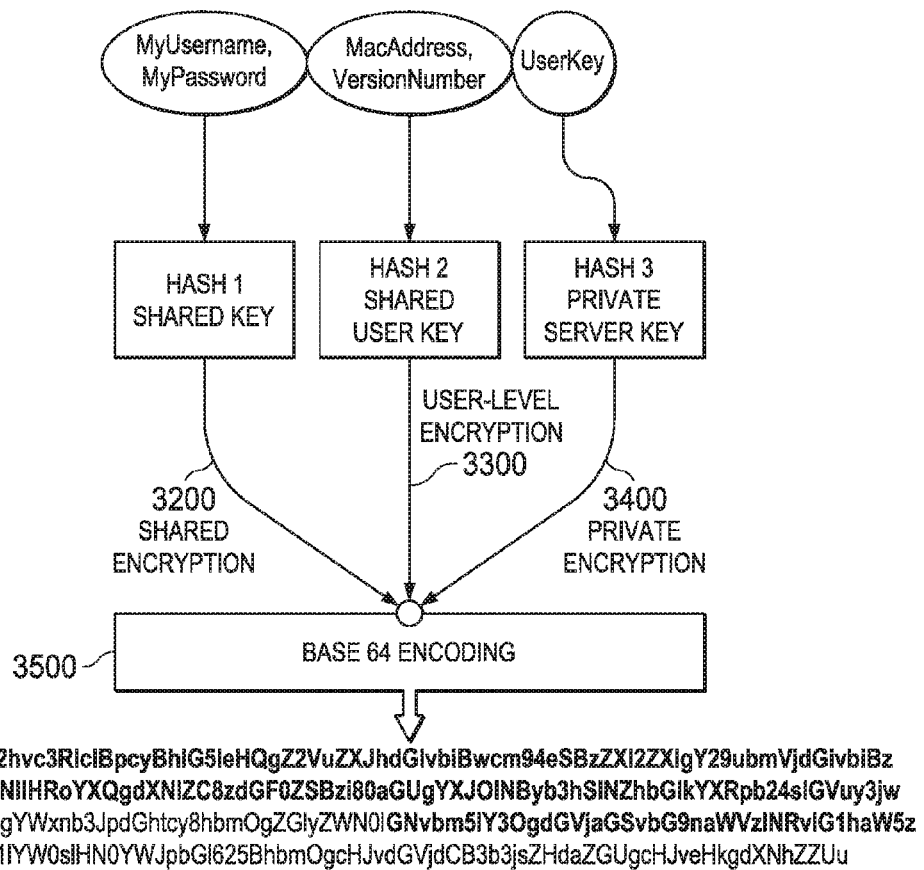
FIG. 7 is an overview of an encryption approach according to an example embodiment.

The Node Data 2700 transmitted from the Central Nodes 2600 to the Requesting Node 100 may be encrypted so that the Node Data 2700 can be transmitted over standard transmission ports (e.g., for HTTP this could be Port 80 or 8080) without the Node Data 2700 being readable by an observer. To attempt to keep a user as anonymous as possible, an example embodiment of the Packet Level Program 1000 may obtain secured transmission protection typically found in protocols including, for example, SSL, by using a layered encryption approach as shown for example in FIG. 7. A layered encryption approach is based on the use of three types of encryption: Shared Encryption 3200, User Encryption 3300 and Private Encryption 3400.

The Shared Encryption 3200 process uses a Private/Public key combination wherein the private key is shared between the Central Nodes 2600 and the Requesting Node 100. The same key combination is shared across all Nodes that interact with a particular Central Server 1400. As a further option, different Central Server 1400 components, namely in distinct geographic regions, use separate Shared Encryption 3200 keys for their sets of Requesting Nodes 100.

The User-Level Encryption 3300 process creates a unique shared encryption key for each user. For example, the unique shared encryption key is based on a combination of a given Requesting Node's Media Access Control (MAC) address and the date and time of the key's creation. The unique shared encryption key is shared between the Central Nodes 2600 and the Requesting Node 100.

The Private Encryption 3400 provides a private key that is not shared and is maintained only on the Central Nodes 2600. The three encryption processes are randomly applied to various parts of messages flowing between the Central Nodes 2600 and the Requesting Nodes 100. To further obfuscate the use of such encryption, the entire encrypted message may be Base-64 encoded to appear as plain text during transmission. The original message can be any combination of text and binary data and still work through this system.

5. Other Integration Options

Figure 8:
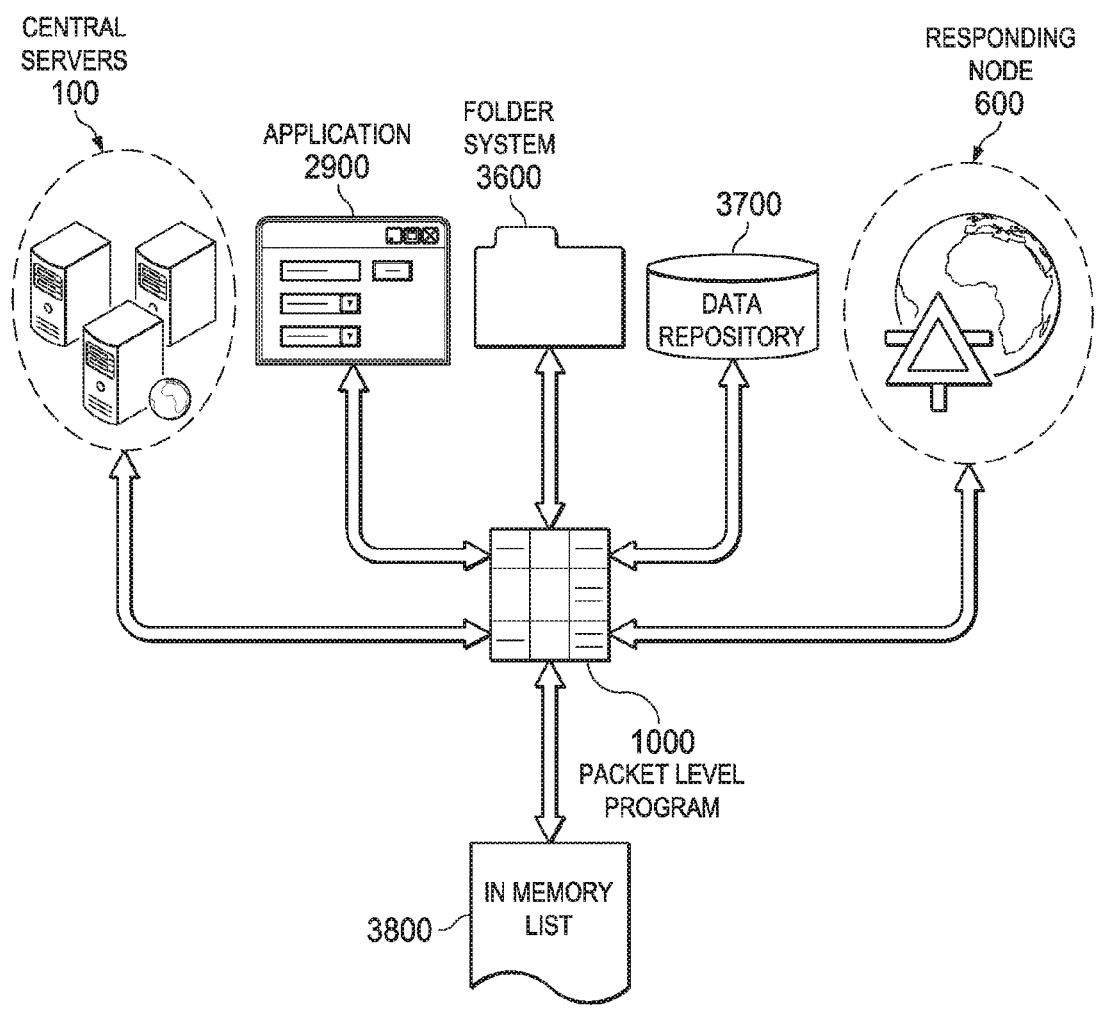
FIG. 8 is a schematic diagram showing various options for data sources and storage locations for a Packet Level Program according to an example embodiment.

FIG. 6 illustrates an integration of a Packet Level Program 1000 according to an example embodiment into an Intermediate Node system 3100. FIG. 8 illustrates other possible integration options for a Packet Level Program 1000 according to example embodiments. As shown in FIG. 8, the Node Data 2700 requested by a Requesting Node 100 may come from, and be stored, across a range of sources. The sources of the Node Data 2700 may be local or remote to the Packet Level Program 1000 (and the Requesting Node 200) and may be in any format using any combination of text data and binary data. Further, the Packet Level Program 1000 may store the Node Data 2700 in any source including its own In Memory List 3800.

Because the Packet Level Program 1000 may be hardwired onto a chipset or embedded in a ROM (Read Only Memory), the Node Data 2700 itself may be embedded within the packet Level Program 1000 and updated through more global options, e.g., a ROM update or operating system patch.

6. Packet Privacy System

A Packet Level Program 1000 according to example embodiments, as described above with described respect to FIGS. 1-7, modifies packets to transform the packets in Content Request Messages and Node Response messages. In an example embodiment shown in FIG. 9, additional features of a Packet Level Program 1000 according to example embodiments are illustrated, in which the Packet Level Program 1000 may successfully modify any or all parts of transmission packages.

The actual data sent by a Node Request 400 from the Packet Level Program 1000 through an Intermediate Node 200 may still be intercepted and pieced together by certain monitoring agencies. Accordingly, simply using an Intermediate Node 200 may not be sufficient to provide complete protection online. There are optional technologies, for example, Virtual Private Tunnels, that provide additional protection, but the mere use of such technologies can draw unwanted attention to otherwise anonymous communications. A scrambling of messages therefore needs to look like normal traffic while providing the same higher level of security of technologies such as VPN.

Figure 10:
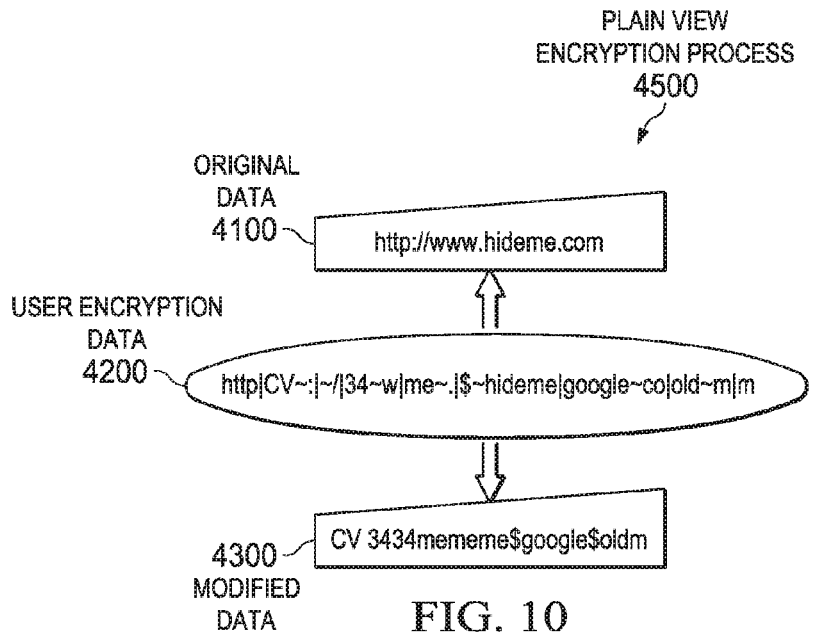
FIG. 10 is a block diagram illustrating a Plain View Encryption process according to an example embodiment.

As shown in FIG. 10, a Plain View Encryption Process 4500, explained in more detail below, may be used by the Packet Level Program 1000 at a Requesting Node 100 to scramble an outbound Content Request 500. Within the scrambled message, the original website URI and Port may be embedded in the outbound Content Request 500. The Content Request 500 is transformed into a Node Request 400 by the Packet Level Program 1000, however, the URI for a given Cryption Node 3900 is used in place of the Target Content's 300 website in the Node Request 400. The Node Request 400 is sent through an Intermediate Node 200 to the Cryption Node 3900. The Cryption Node 3900 may be any Requesting Node 100 set in any configuration including, for example, client-server, peer-to-peer and mainframe architectures. The Cryption Node 3900 may be a single process on a shared Node, a single physical or virtual Node or a plurality/combination thereof. The Cryption Node 3900 uses User Encryption Data 4200 to decrypt the contents of the Node Request 400. The Cryption Node 3900 may use the same Intermediate Node 200 as was used to send the Node Request 400 to the Cryption Node 3900, a new Intermediate Node 200 or no Intermediate Node 200 to obtain the Target Content 300 from the intended destination by acting on behalf of a new Requesting Node 100 or the original Requesting Node 100. For example, online anonymity may be maximized if the Cryption Node 3900 acts as a new Requesting Node 100. On the other hand, providing secured access to a corporate network, as provided in other example embodiments, may require the identifying information from the original Requesting Node 100.

If the Cryption Node 3900 acts on behalf of the Requesting Node 100, the Cryption Node 3900 can utilize any or all parts of the incoming Node Request 400 to generate its own Node Request 400 or Content Request 500, depending on the intended destination. The parts of the incoming Node Request 400 utilized by the Cryption Node 3900 may include identifying information from the Requesting Node 100, encrypted or decrypted pieces of data and/or other aspects of the request sufficient for the intended recipient Node to be able to process the generated request.

The Cryption Node 3900 may also act as a Responding Node 600 for the initial Intermediate Node 200. After the Cryption Node 3900 receives the Target Content 300, the Cryption Node 3900 may use the User Encryption Data 4200 to scramble the data, and the Cryption Node 3900 may send the Content Response 700 back to the original Intermediate Node 200.

The original Intermediate Node 200, in turn, sends the Node Response 700 back to the Packet Level Program 1000 at which the User Encryption Data 4200 is used to decrypt the Target Content 300. The Node Response 700 may be transformed into a Content Response 700 by the Packet Level Program 1000 prior to being sent to the Computer Application 900 that initiated the request.

7. Plain View Encryption

As shown in FIG. 10, a Plain View Encryption Process 4500 according to example embodiments provides further details of scrambling techniques referred to in example embodiments described above with respect to FIG. 9. A premise of the Plain View Encryption Process 4500 is that each End User 2800 generates a unique User Encryption Data 4200 set that instructs the Packet Level Program 1000 and the Cryption Node 3900 on how to scramble and descramble inbound and outbound packages. It should be noted that the User Encryption Data 4200 is described with a simple text translation process for illustrative purposes only. In another example embodiment, a combination of bit-level transformations, character replacement, and binary image swapping techniques, amongst other techniques, may be utilized by the User Encryption Data 4200.

The User Data Encryption 4200 set provides a target set of data—characters in an example embodiment shown in FIG. 10—along with the replacement values. In FIG. 10, the scrambling process has been reduced to a target value such as "http" matched with a pipe (|) separated replacement value such as "CV". The various replacement options, in this example, are then joined together using tilde (~) values; however, the one skilled in the art will recognize that replacement values are not limited thereto.

As can be seen in FIG. 10, going down from Original Data 4100 through application of the User Encryption Data 4200 results in Modified Data 4300. The Modified Data 4300 is meaningless, but appears as normal traffic. Going up from the Modified Data 4300 through application of the User Encryption Data 4200 results in the Original Data 4100.

8. Communications Encryption

Figure 11:
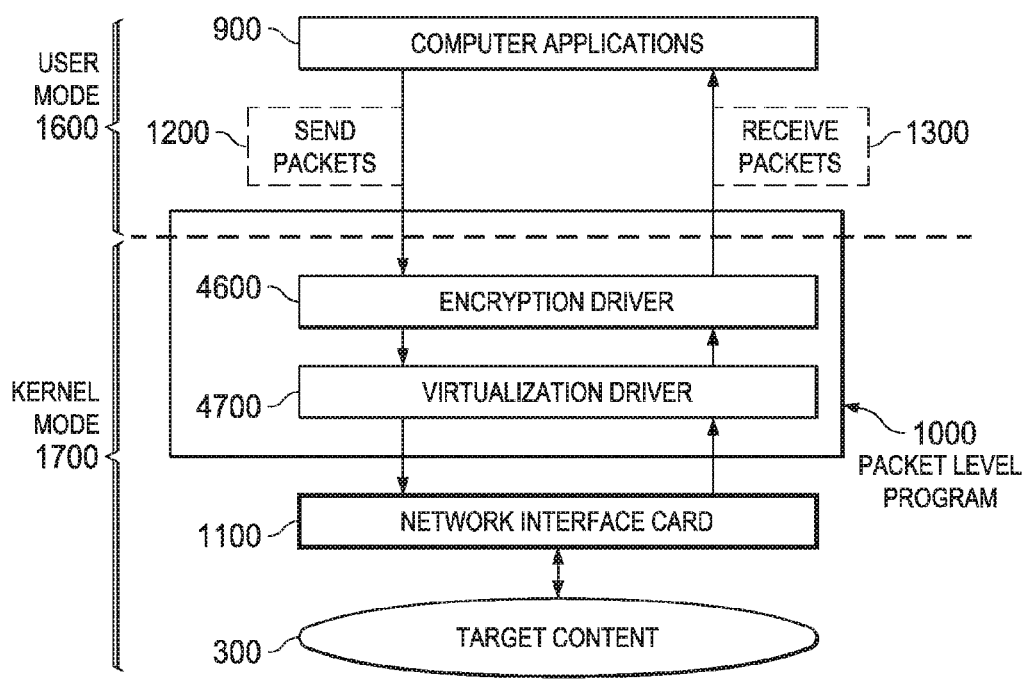
FIG. 11 is a schematic diagram showing an Encryption Driver and a Virtualization Driver within a Packet Level Program according to an example embodiment.

FIG. 11 is a schematic diagram showing an Encryption Driver and a Virtualization Driver within a Packet Level Program according to an example embodiment. A separate Encryption Driver 4600 may encrypt and decrypt packets of data in the Packet Level Program 1000. The Encryption Driver 4600 works in conjunction with a Virtualization Driver 4700 in the Packet Level Program 1000 to handle Communications Virtualization and, depending on an example embodiment, utilize Intermediate Nodes 200.

The Encryption Driver 4600 may utilize an encryption algorithm that may be embedded directly into the driver, obtained through an external process or through some combination thereof. For example, the Encryption Driver 4600 may utilize a Public/Private key encryption approach that is embedded directly in the driver. Key values of the encryption, however, may be configurable through a separate process, for example, a secured desktop application or a configuration file. The pluggable type of encryption may utilize Reflection or another similar discovery process to utilize independent processes including, for example, files, services or calls to other such processes. For example, the Encryption Driver 4600 may use Reflection to dynamically load a Dynamic Link Library (DLL) and utilize the methods found therein for encryption and/or decryption processes.

In an example embodiment, the Virtualization Driver 4700 receives Send Packets 1200 and sends the Send Packets 1200 to the Encryption Driver 4600. The Encryption Driver 4600 encrypts the Send Packets 1200 and sends the encrypted packets back to the Virtualization Driver 4700. The Virtualization Driver 4700 may reconfigure the encrypted Send Packets 1200 to utilize a specific Intermediate Node 200 and send the packets to the Network Interface Card 1100. In another example embodiment, the Virtualization Driver 4700 may not modify the Send Packets 1200, but still perform the Communications Virtualization as described previously above.

In still another example embodiment, the Virtualization Driver 4700 may not exist, with the only driver in the Packet Level Program 1000 being the Encryption Driver 4600. If the only driver is the Encryption Driver 4600, the Encryption Driver 4600 may only encrypt the main content of the individual packets while leaving the packet headers untouched or modified only as needed to support encryption size expansion. For example, some encryption may increase the overall size and number of packets requiring additional packets to be created and inserted into the outgoing set of Send Packets 1200.

In another example embodiment, the Encryption Driver 4600 may receive the send packets before the Virtualization Driver 4700 and encrypt entire send packets without modification by the Virtualization Driver 4700. In example embodiments in which the Encryption Driver 4600 encrypts the packets and the Virtualization Driver 4700 does not use an Intermediate Node 200, regardless of where or how the Send Packets 1200 enter the Encryption Driver 4600, the Virtualization Driver 4700 may send packets to a preconfigured node, for example, another Packet Level Program 1000 or a Cryption Node 3900. The preconfigured node may be defined statically, result from an optional set of business rules, or be based on communication path, protocol or other dynamic measure.

9. Virtualizing Applications

Figure 12:
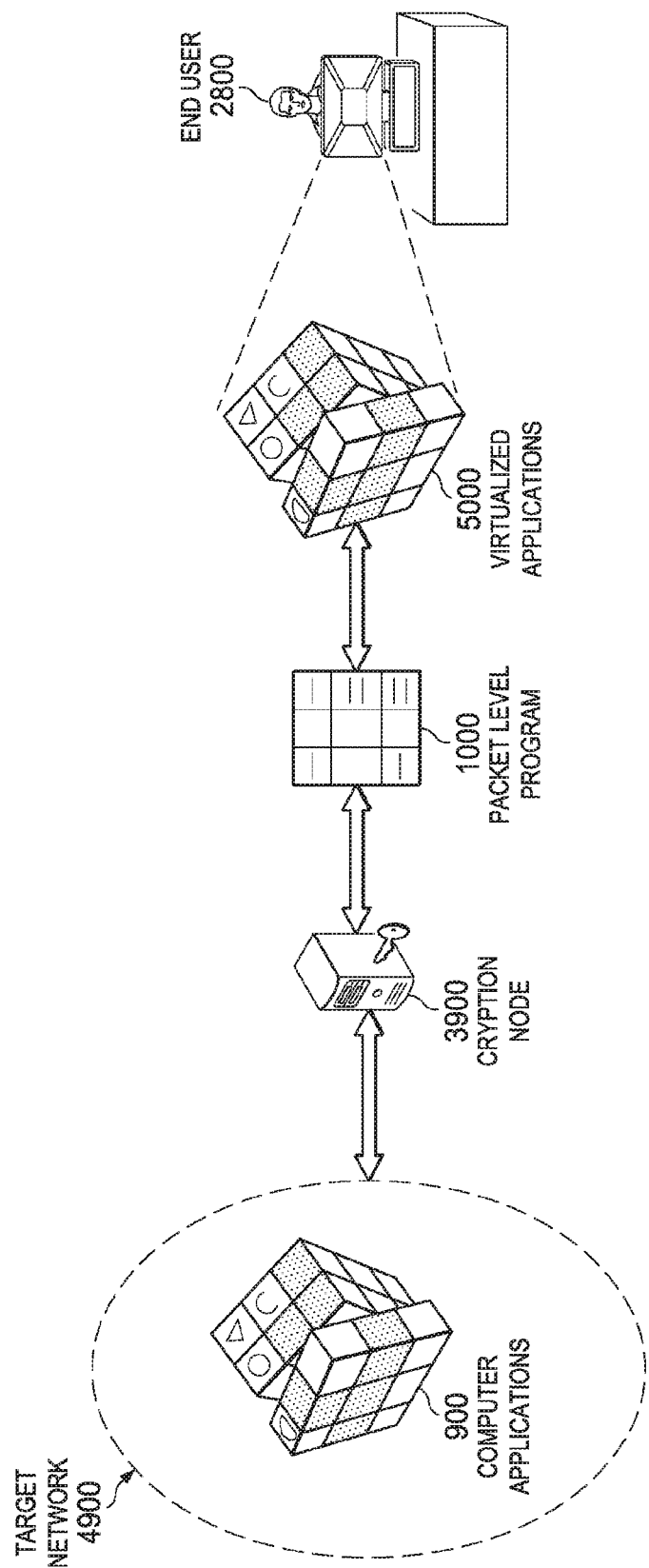
FIG. 12 is a schematic view of a Packet Level Program for providing secured access to Computer Applications according to an example embodiment.

FIG. 12 is a schematic view of a Packet Level Program for providing secured access to Computer Applications according to an example embodiment. The Encryption Driver 4600 and the Virtualization Driver 4700 may be used by the Packet Level Program 1000 to virtualize applications over a network. In an example embodiment, an End User 2800 interacts with Virtualized Applications 5000 residing on a Requesting Node 4800. The Virtualized Applications 5000, in turn, send requests for local resources which are intercepted by the Packet Level Program 1000. While these local resources normally exist or are executed in the same environment as the Virtualized Applications 5000, the Packet Level Program 1000 alters the requests for resources using one or more of the methods above to protect the communications and then sends those requests back to the Target Network 4900. In another example embodiment, the End User 2800 is presented with a view of a Requesting Node 100 on which the Virtualized Applications 5000 exist and that resides in a Target network 4900, and all user inputs including, for example, key presses on a keyboard, mouse movements or screen depressions or movements are intercepted and altered by the Packet Level Program 1000 in accordance with one or more of the methods described above. The Packet Level Program 1000 may use the Encryption Driver 4600 to encrypt the specific request prior to sending the request packets to the Virtualization Driver 4700. In an example embodiment wherein the Virtualized Applications 5000 exist on the Requesting Node 100 in the Target Network 4900, the Virtualization Driver 4700 is used to make the Virtualized Applications 5000 react as if remote data/resources were obtained locally by, for example, sending all traffic to at least one of a plurality of Cryption Nodes 3900 depending on a range of rule and/or configuration options.

An alternative example embodiment may utilize a verification process to enable a user to directly communicate with a Requesting Node 100 on a Target Network 4900. The verification process may be hardcoded into the End User's 4800 terminal, or the verification process may be the result of an authentication and/or authorization process, for example, a login process. If the Virtualized Applications 5000 exist on the End user's 4800 terminal, the Virtualization Driver 4700 may send communications directly to the Requesting Node 100 on the Target Network 4900 or send all communications through a Cryption Node 3900. An alternative example embodiment may send a portion of the communications directly to the Requesting Node 100 and others through the Cryption Node 3900 depending on various details including, for example, initialization, monitoring and logging needs.

In other example embodiments, in which an interface to a Requesting Node 100 in a Target Network 4900 is provided to an End User 2800, the Virtualization Driver 4700 may not be present and the Encryption Driver 4600 may send the packets to their intended target. Alternatively, the Virtualization Driver 4700 may not maintain virtualization data and only send packets to their intended destination.

Example embodiments may optimize communications by precluding encryption altogether, or an example embodiment may use the Encryption Driver 4600 to compress outgoing content and/or forgo encryption. Data compression may be defined as a variant of encryption and may include any process that alters any part or the total packet of communication. Accordingly, an example embodiment may not utilize encryption but may, instead, compress communications to enhance speed. Other example embodiments may encrypt accordingly to rules that focus on the stage of communication (e.g., initialization, working, or saving), or the level of data being transmitted (e.g., Public, Secret, or Top Secret).

Encryption by the Packet Level Program 1000 may occur in both communication directions, occur in one communication direction or utilize a variable set of rules that are the same or different for each communication direction. In an example embodiment, login credentials may be encrypted and sent out to a Cryption Node 3900. The Cryption Node 3900 may decrypt the credentials because the Cryption Node 3900 resides within a Target Network 4900. The Cryption Node 3900 may compress the resultant response and send the compressed response back to the End User 2800, but not encrypt the content of the compressed response.

10. Secured, Anonymous Access

Figure 13:
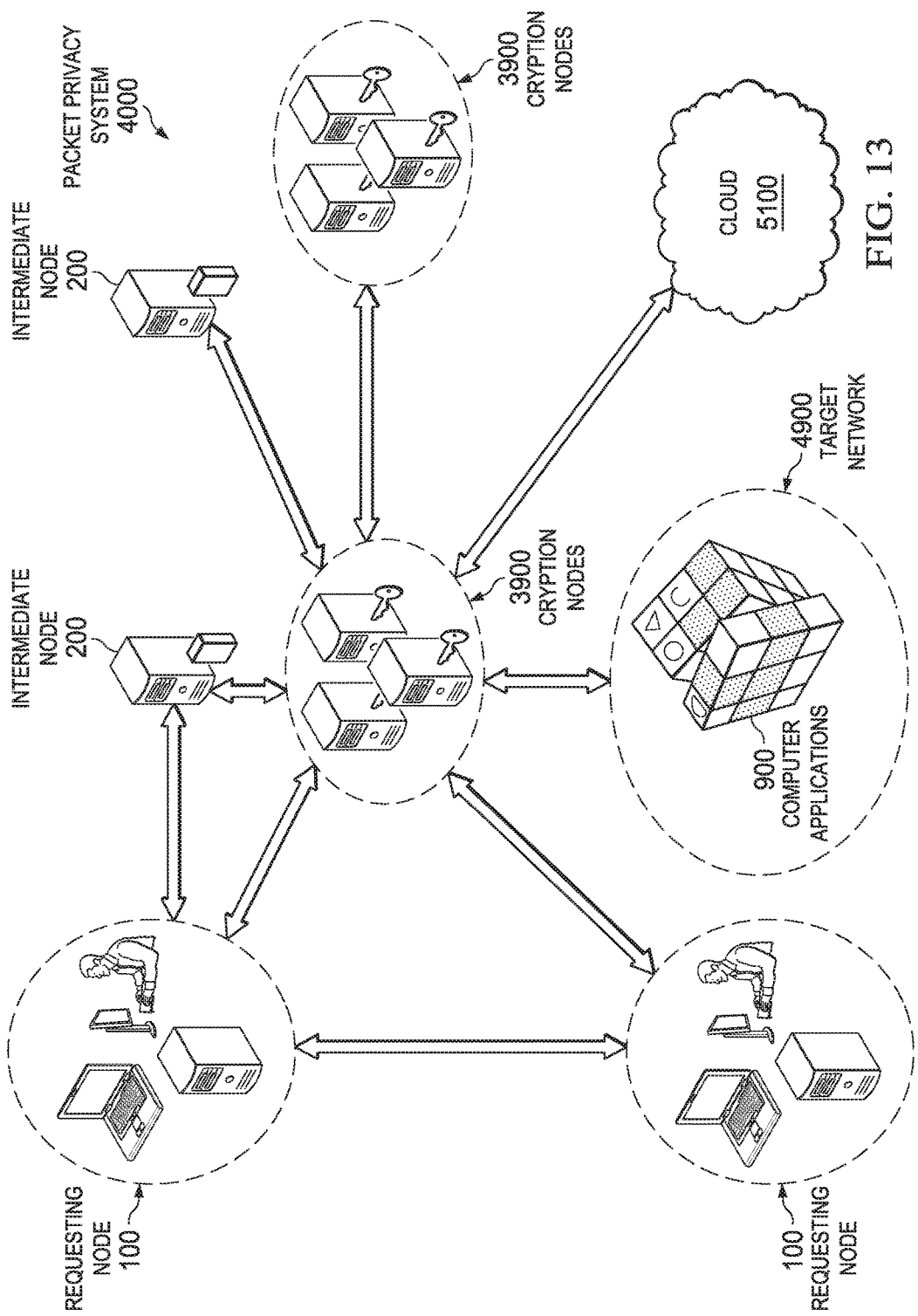
FIG. 13 is an overview of an encryption process combined with a Cryption Node to provide a range of secure communications according to an example embodiment.

In order to provide more secure communications, various example embodiments may be combined together, for example, as illustrated in FIG. 13. FIG. 13 is an overview of an encryption process combined with a Cryption Node to provide a range of secure communications according to an example embodiment. The dotted double-headed arrows in FIG. 13 represent a range of communications that may occur. An example embodiment may utilize the Encryption Driver 4700 to encrypt communications using one type of encryption in one communication direction and another type of encryption in another communication direction, or the same type of encryption in both communication directions. Encryption may be varied by type of data, Requesting Node 100, Responding Node 600, communication path, protocol, type and/or direction or any combination thereof.

Protocol wrapping may be utilized and varied along the same lines. Accordingly, the Packet Level Program 1000 may encrypt all communications and wrap all protocols to, for example, appear as normal HTTP traffic. An example embodiment may send the communications to a Cryption Node 3900 where the communications can be decrypted prior to being sent to a number of optional nodes. The communication may occur directly between Requesting Nodes 100 and may or may not be decrypted on either end.

Communications going to a given node may be decrypted and/or unwrapped. A Cryption Node 3900, for example, may decrypt a given Node Request 400 from a Requesting Node 100 and act as a Requesting Node 100 itself in obtaining Target Content 300. In an example embodiment, the Cryption Node 3900 may encrypt any or all parts of the communication prior to sending the communication to another node. The encryption by the Cryption Node 3900 may occur on decrypted packets or on already encrypted packets, thereby adding another layer of encryption.

Anonymity may thus be maintained by sending communications over a standard port and/or by modifying packets of data in an unobtrusive manner. A further example embodiment may utilize a Cryption Node 3900 as an Intermediate Node 200 to prevent unwanted observers from determining the intended target of a communication. For example, the Requesting Node 100 would be observed as communicating with the Cryption Node 3900. Furthermore, protocol wrapping may cause all communications to appear as simple web traffic. Various communications, for example, chatting and downloading, thus appear as normal web traffic, and optional encryption protects the communications even if an unwanted observer intercepts the traffic.

11. Examples

Figure 14:
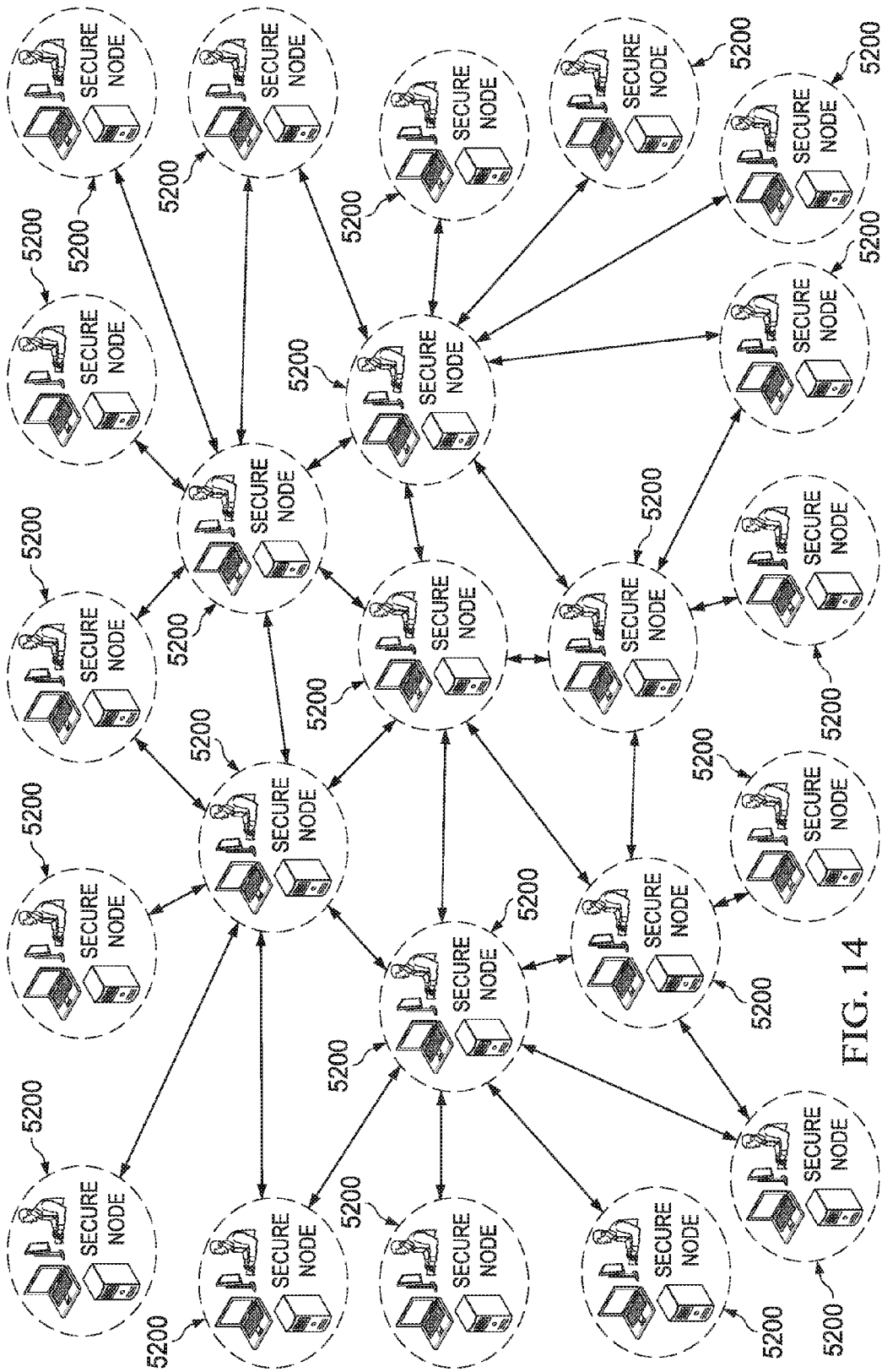
FIG. 14 is a diagram illustrating Requesting Nodes for dynamically creating peer networks according to an example embodiment.

FIG. 14 is a diagram illustrating Requesting Nodes for dynamically creating peer networks according to example embodiments. A series of Requesting Nodes 100 may discover and communicate with one another. To provide insights into this process, a series of examples that support key-based encryption methodologies and discovery according to example embodiments are described below. It should be noted that not all example embodiments utilize encryption and, of those example embodiments that utilize encryption, only a portion thereof use key-based encryption. Other example embodiments may utilize keyless encryption. In the below described examples, a Requesting Node 100 that utilizes a Packet Level Program 1000 is referred to as a Secured Node 5200.

Secured Node 5200 to Secured Node 5200 Communications

Example 1.1: Synchronous Key Architecture

Each Secured Node 5200 may maintain a registry of URI values and Public Keys for other Secured Nodes 5200 in its network. Any Secured Nodes 5200 connected through End User 2800 actions may be added to the registry. Through the network of each Secured Node 5200, Secured Nodes 5200 securely manage synchronous keys.

A basic premise of a synchronous key architecture is that an Intermediate Node System 3100, for example, as shown in FIG. 6, may initiate, at any time, a Synchronous Key Update based on a triple-encrypted key mechanism. The first layer of encryption may be a hardcoded asynchronous public key token that provides the new synchronous key as well as the old key value. The private key may be held only in Central Nodes 2600 and never be disseminated. Both old and new synchronous key values are needed in order to validate a key update. The next layer of encryption may encrypt the hardcoded key with the current synchronous key. The resultant value may be disseminated from a Central Node 2600 by encrypting the value with each local network registrant's public key. The updated key is sent to each Secured Node 5200 where the values are decrypted and used to update local key values. To aid in distribution lag times, a 24-hour period of time may be maintained during which both synchronous keys are valid. Each Secured Node 5200, in turn, may encrypt the original double-encrypted value with each public key in its local network prior to sending the key on to other Secured Nodes 5200. If a given update which contains the current old and new synchronous keys is received by a Secured Node 5200, the update may be ignored by the Secured Node 5200 and not further disseminated.

If a new Secured Node 5200 comes online, the new Secured Node 5200 may use its Private Key to send out encrypted update requests to all Secured Nodes 5200 in its registry. If the system is new, it may receive updated synchronous keys after it has registered its local network.

Example 1.2: Secured Node 5200 Connections

A Secured Node 5200 in one location may connect to a Secured Node 5200 in another location. For such a connection to occur, the following steps may be followed:

When a Secured Node 5200 initializes, the Secured Node 5200 may register with its local network. The registration process may include sending a query on a specific port that is being monitored by other Secured Nodes 5200. End Users 2800 may be asked to create a unique name while registering their Computer Application 2900, and the unique name is used for discovery purposes.

The query sent by the registration process may be encrypted using the new Secured Node's 5200 Public Key using a synchronous key and the new Secured Node's 5200 data which includes, for example, a transmission timestamp, maximum transmission delay and username encrypted using the same Public Key. The Public Key may be a user level key which is generated during the installation process and will only be resident on the local computer. Alternatively, the Public Key may be generated asynchronously during registration or some other process. If a given registration attempt fails, the new Secured Node 5200 may send out new registration requests with larger and larger maximum transmission delay values.

The monitoring Secured Nodes 5200 may decrypt the incoming data and respond if the timestamp is within the maximum transmission delay of the current time. If a given monitoring Secured Node 5200 does respond, that Secured Node 5200 may register the new Secured Node 5200 in its registry, or some other local data source, as part of its local network by storing information including, for example, the remote IP address and Public key.

The monitoring Secured Node 5200 may encrypt its public key with the new Secured Node's 5200 Public Key and send a response encrypted as such back to the new Secured Node 5200.

The new Secured Node 5200 may add all responses into its local registry. Other example embodiments may use any resource including for example, a file on a file system, a service, separate process, database, queue, cache or other permanent or transient memory source. The local data source itself may be encrypted using a separate locally-generated synchronous user-level key which is created in the same manner as the user level key.

Once registered, the End User 2800 may attempt to communicate with another End User 2800 by either entering a target IP address or a target username among other possible values.

The attempted communication action may result in a Private Key-Encrypted transmission which contains a connection request being sent out. URI entry may be sent directly to that URI. A Username entry may be sent to the local network unless the name is already known, in which case the name may be translated into a target URI.

If the target Secured Node 5200 is not in the local network, each Secured Node 5200 in the network may encrypt the request with their own Private Key and send that message to each of their local network registrants. Duplicate requests may be ignored. This process may flow all the way out globally as shown in FIG. 14.

Once the target Secured Node 5200 receives a request, its End User 2800 is notified and can either accept or decline the connection request. Either the accept or decline response is sent back to the originating Secured Node 5200. The same routing/Private Key mechanism used on the way out can be used on the way back in a given example embodiment.

For a decline, the only information sent back may be a rejection notification.

For an accept, the target Secured Node 5200 may generate a synchronous Session Key which the target Secured Node 5200 combines with its URI and encrypts with its Private User-Level Asynchronous Key, and the target Secured Node 5200 encrypts its Public Key with the source system's Public Key and sends the encrypted URI and Public Key back. The Source Secured Node 5200 registers the target Secured Node 5200 in its local data source and uses the Session Key to encrypt subsequent direct TCP traffic to that target system. Session keys are only valid for the duration of the session.

Additional Secured Nodes 5200 can be added to the current session using the same process found in the response from the target Secured Node 5200

Example 1.3: Managed Networks

Corporate connections involving Secured Nodes 5200 work as described in Example 1.1 in that dynamic discovery and registration may be used. Enterprises may want to control the Secured Nodes 5200 allowed to interact with a given Target Network 4900. An enterprise may control the Secured Nodes 5200 by, for example, either controlling the encryption or by managing the data sources. In some example embodiments using encryption, if the Packet Privacy System 4000 cannot decrypt incoming traffic, the Packet Privacy System 4000 may ignore the encrypted traffic. Thus, changing the encryption at the enterprise level may automatically create dynamic corporate nodes amongst specific Secured Nodes 5200.

Another example embodiment may utilize a level of control involving disabling discovery and relying instead on centrally-managed data sources. Using a mechanism similar to the Synchronous Key management approach, Managed Networks may be disseminated from one location, however the transmissions may not be sent out by the recipients. The same process may be used for the Synchronous Key updating, in which transmissions from the central systems may not be retransmitted by the recipients.

This system, however, may go one step further in that the creation of installation packages in the Managed Networks environment may send out a Synchronous Key-encrypted registration message only to the Central Nodes 2600 and Secured Node 5200. Only that Secured Node 5200 will add the registration entries and it is up to that Secured Node 5200 to add the new system to its local data source. On the Central Nodes 2600, a desktop application may be provided that allows an authorized End User 2600 to send out Synchronous Key updates to different sets of Secured Nodes 5200 and to managed different levels of local data according to enterprise security demands.

Whenever a given local data store is updated, the affected Secured Node 5200 may be sent an update via a queued response as described previously. However, instead of neighbor querying, update queries be sent only to the Central Nodes 2600.

To enable these communications, the Managed Networks system may provide a variable number of synchronous keys to enable multiple levels of communication. Thus, an administrator may provide a general use synchronous key to all users, a management level key for management and an executive key for only the top-level systems, thereby providing a secure mechanism wherein a given system can utilize varying levels of security based on an End User 2600 selection. Additional incoming requests can be identified by the synchronous key being utilized.

Example 1.4: Server-Based Systems

Examples 1.1 and 1.2 describe the utilization of point-to-point communication paths between Secured Nodes 5200. The present example builds on top of those scenarios to provide a Cryption Node 3900 based portal into a given Target Network 4900. Many VPN solutions in the current market offer to level of functionality in which a user accesses a dedicated server to gain network entry. In conventional options, the VPN server maintains a virtual user instance and remotely sends local data back to the end user. These conventional options are very resource intensive and thus require significant hardware resources.

Example embodiments provide a superior option by redirecting remote queries through a secured interface between nodes, i.e., a Cryption Node 3900. To the enterprise network the communications appear local and to the End User's 2800 Applications 900 the communications appear as if the Applications 900 are residing within the target network. To enable these features, the Packet Level Program 1000 may utilize a port forwarding/parallel processing approach wherein each incoming user is offloaded to a lightweight protocol processing instance. Unlike the heavier VPN user instances, these optional instances are merely encrypting and decrypting traffic to and from the network. Each instance handles the Communication Virtualization locally for the network just as the client system is handling the communications locally on the Secured Node 5200. Transmissions between the two endpoints may be encrypted as previously described.

12. Encrypted, Rolled Communications

Example embodiments may unwind packets and, for non-HTTP traffic, embed the packets into HTTP-based TCP output. In this manner, the fundamental packets of information can be deconstructed into a generic stream and re-packaged into a new series of generic protocol packets, such as TCP or UDP. Inserted into the front of the stream can be packets of data (one possible example being a TCP header packet) that provides details on the original communication protocol. Once the protocol layer has been created, the upper level (for example IP and HTTP) layers can be constructed based on the new stream. Thus, all information sent from the Packet Level Program 1000 appears as standard HTTP traffic. The traffic sent from the Packet Level Program 1000 may be passed through an Encryption Driver 4600 to enable the encryption protection. Processing of the traffic after encryption is described in the following examples below.

Example 2.1: Point To Point Communications

Communications from one Secured Node 5200 may be sent directly to another Secured Node 5200 in an example embodiment. The encrypted communications may be sent directly to the second Secured Node 5200 where a Packet level Program 1000 decrypts the traffic, unwinds the wrapped protocol and restores the packets back to their original state. Other example embodiments may utilize Intermediate Nodes 200 or Cryption Node 3900 configured to optionally decrypt, change encryption, or leave the communication unmodified. The communications are sent to the Computer Applications 900 for processing. An example of this type of communication is torrent downloading or chat communications.

Example 2.2: Cryption Node 3900 Interactions

The first two sets of embodiments in this Examples section do not require Cryption Servers 3900 to work properly, but they do require Secured Nodes 5200 on both ends of the communication path. Other example embodiments may utilize Cryption Servers 3900 or the same decrypting/unwrapping processes as is found in previous examples described above.

An example embodiment using Cryption Servers 3900 may process all requests in a parallel manner. An example embodiment may utilize a User Mode 1600 application built to handle the parallel processing such that the underlying driver systems are run in a serial fashion. Thus, the drivers handle capturing traffic and forwarding the traffic to a higher level application that unwinds the TCP, decrypts the content and reverts the content back to its original format. The User Mode 1600 application handles, in parallel, submitting the content to its intended destination using the original protocol and handles receiving the results and packaging the results therein.

Thus, while there have been shown and described and pointed out fundamental novel features of the present disclosure as applied to preferred embodiments and examples thereof, it will be understood that various omissions and substitutions and changes in the form and details of the devices described and illustrated, and in their operation, and of the methods described may be made by those skilled in the art without departing from the spirit of the present disclosure. For example, it is expressly intended that all combinations of those elements and/or method steps which perform substantially the same function in substantially the same way to achieve the same results are within the scope of the disclosure. Substitutions of elements from one described embodiment or example to another are also fully intended and contemplated. It is the intention, therefore, to be limited only as indicated by the scope of the claims appended hereto.

What is claimed is:

1. A method for modifying a data packet, comprising steps of:
   receiving the data packet comprising a header having an original header structure from a non-physical layer immediately adjacent to a physical layer;
   instantiating the non-physical layer as part of a boot operation of an operating system associated with the non-physical layer, wherein the non-physical layer is loaded during the boot operation independent of loading the operating system;
   performing an operation on at least a portion of the data packet other than the header, thereby creating a modified data packet with unchanged header information and maintaining the original header structure;
   transmitting the modified data packet, including the original header structure, to the physical layer;
   wherein the steps are performed using a computational machine specifically configured to modify the data packet.

2. The method of claim 1 wherein the steps of receiving the data packet, performing an operation and transmitting the data packet are executed in a kernel mode.

3. The method of claim 1 further comprising one or more steps executed in a kernel mode and one or more steps executed in a user mode, wherein:
   the step of receiving the data packet is executed in the kernel mode;
   the step of transmitting the data packet is executed in the user mode;
   the step of performing the operation is executed in the user mode; and
   further comprising transmitting the steps executed in the user mode to the kernel mode.

4. The method of claim 1 wherein a portion of the non-physical layer executes in a kernel mode and a portion of the non-physical layer executes in a user mode, the method further comprising:
   placing configuration information by the portion of the non-physical layer executing in the user mode into locations accessible to the portion of the non-physical layer executing in the kernel mode;
   receiving the data packet by the portion executing in the kernel mode;
   obtaining data from the locations in the user mode by the portion of the non-physical layer executing in kernel mode; and
   performing the operation and transmitting the modified data packet by the portion executing in the kernel mode.

5. The method of claim 1 wherein the non-physical layer only performs the operation on packets directed to one or more particular ports but does not perform the operation on packets directed to ports other than the one or more particular ports.

6. The method of claim 1 wherein the non-physical layer only performs the operation on packets directed to one or more particular IP addresses but does not perform the operation on packets directed to IP addresses other than the one or more particular IP addresses.

7. The method of claim 1 wherein a first portion of the data packet modification occurs on a first computational machine and a second portion of the data packet modification occurs on a second computational machine.

8. The method of claim 7 further comprising updating the non-physical layer to apply an encryption algorithm to at least a portion of the data packet.

9. The method of claim 7 further comprising:
   receiving at least a first and a second data packet;
   applying a first encryption algorithm to a portion of the first data packet; and
   applying a second encryption algorithm to a portion of the second data packet.

10. The method of claim 7 further comprising applying a first encryption algorithm to a data packet received at a first time and applying a second encryption algorithm to a data packet received at a second time, wherein the non-physical layer alters the first and second encryption algorithms applied to one or more data packets at different points in time.

11. The method of claim 7 further comprising applying, by the non-physical layer, an encryption algorithm to a data packet.

12. The method of claim 1 wherein the portion of the data packet other than the header comprises a core datagram.

13. The method of claim 1 further comprising steps of:
   compressing at least a portion of the data packet;
   encrypting at least a portion of the data packet; and
   inserting data in to the data packet;
   wherein the method is configured to run over wireless, wired, cellular, optical, satellite, Internet, and TCP/IP communication protocols.

14. A system, comprising:
   at least one processor to execute an operating system and one or more applications;
   a physical layer coupled to a network; and
   a non-physical layer immediately adjacent to the physical layer, the non-physical layer executing instructions to:
      receive a data packet comprising a header having an original header structure from the operating system,
      instantiate the non-physical layer as part of a boot operation of the operating system, wherein the non-physical layer is loaded during the boot operation independent of loading the operating system;
      perform an operation on at least a portion of the data packet other than the header, thereby creating a modified data packet without changing header information while the original header structure is maintained; and
      transmit the modified data packet, including the original header structure, to the physical layer;
      wherein the execution of the operating system and the one or more applications by the at least one processor is performed by using a specifically configured computational machine for modifying the data packet.

15. The system of claim 14 wherein the steps of receiving the data packet, performing an operation and transmitting the data packet are executed in a kernel mode.

16. The system of claim 14 wherein the non-physical layer only performs the operation on packets directed to one or more particular ports but does not perform the operation on packets directed to ports other than the one or more particular ports.

17. The system of claim 14 wherein the non-physical layer only performs the operation on packets directed to one or more particular IP addresses but does not perform the operation on packets directed to IP addresses other than the one or more particular IP addresses.

18. The system of claim 14 wherein the operation of a portion of the data packet comprises encrypting the portion of the data packet while not encrypting the original packet header.

* * * * *

UNITED STATES PATENT AND TRADEMARK OFFICE
CERTIFICATE OF CORRECTION

PATENT NO. : 9,992,180 B2  
APPLICATION NO. : 15/136641  
DATED : June 5, 2018  
INVENTOR(S) : Kenneth C. Tola, Jr. and Keith Withington Page 1 of 1

It is certified that error appears in the above-identified patent and that said Letters Patent is hereby corrected as shown below:

On the Title Page

Item (72) should read:
-- (72) Inventor: Kenneth C. Tola, Jr., Westfield, NJ (US)
Keith Withington, Carmine, TX (US) --

Signed and Sealed this
Fourteenth Day of July, 2020

Andrei Iancu
*Director of the United States Patent and Trademark Office*